United States Patent [19]

Kaplan et al.

[11] Patent Number: 5,481,147
[45] Date of Patent: Jan. 2, 1996

[54] SYNCHRONOUS INDUCTOR ELECTRIC MOTOR

[75] Inventors: Martin Kaplan, Avon; Peter Senak, Jr., Bristol, both of Conn.

[73] Assignee: Dana Corporation, Toledo, Ohio

[21] Appl. No.: 177,357

[22] Filed: Jan. 3, 1994

Related U.S. Application Data

[63] Continuation-in-part of Ser. No. 839,200, Feb. 20, 1992.

[51] Int. Cl.$^6$ ............................. H02K 1/02; H02K 21/28
[52] U.S. Cl. ......................... 310/154; 310/114; 310/179; 310/261; 310/117; 310/254
[58] Field of Search ..................... 310/154, 261, 310/49 R, 162–164, 166, 112, 114, 89, 254, 259, 179, 185, 42, 268, 180, 168, 106, 80; 318/701

[56] References Cited

U.S. PATENT DOCUMENTS

| | | |
|---|---|---|
| 155,237 | 9/1874 | Hochhausen . |
| 606,863 | 7/1898 | Gutmann . |
| 2,073,760 | 3/1937 | Schou . |
| 2,560,560 | 7/1951 | Doherty . |
| 2,811,658 | 10/1957 | Brainard . |
| 2,968,755 | 1/1961 | Baermann . |
| 3,005,118 | 10/1961 | Ranseen . |
| 3,372,291 | 3/1968 | Lytle et al. . |
| 3,448,306 | 6/1969 | Murray . |
| 3,469,124 | 9/1969 | Willcox . |
| 3,500,081 | 3/1970 | Drejza et al. . |
| 3,508,091 | 4/1970 | Kavanaugh . |
| 3,510,699 | 5/1970 | Fredrickson . |
| 3,700,944 | 10/1972 | Heintz . |
| 3,757,147 | 9/1973 | Lyman, Jr. . |
| 3,783,313 | 1/1974 | Mathur . |
| 3,806,744 | 4/1974 | Abraham et al. . |
| 3,838,370 | 9/1974 | Ueno . |
| 3,942,054 | 3/1976 | Kristen et al. . |
| 3,944,863 | 3/1976 | Apsit et al. . |
| 4,349,957 | 9/1982 | Lundin . |
| 4,355,249 | 10/1982 | Kenwell . |
| 4,358,692 | 11/1982 | Hallerback . |
| 4,501,980 | 2/1985 | Welburn . |
| 4,593,216 | 6/1986 | Willcox . |

(List continued on next page.)

FOREIGN PATENT DOCUMENTS

| | | |
|---|---|---|
| 335539 | 2/1959 | Switzerland . |
| 375339 | 6/1932 | United Kingdom . |

OTHER PUBLICATIONS

IBM Technical Disclosure Bulletin, "Stepping Motor with Electromagnetically Generated Rotor Flux"; Dec., 1966.

*Primary Examiner*—R. Skudy
*Attorney, Agent, or Firm*—MacMillan, Sobanski & Todd

[57] ABSTRACT

A synchronous inductor electric motor includes a hollow stator having a plurality of permanent magnets secured to the inner surface thereof. The magnets are radially polarized in alternating fashion about the inner circumference of the stator. A plurality of radially inwardly extending stator teeth are provided on each of the magnets so as to exhibit a polar magnetization which is the same as the adjacent magnets. A rotor assembly supported concentrically within the stator includes a shaft having a plurality of rotor pole sub-assemblies provided thereon. Each of the rotor pole sub-assemblies includes a hub secured to the shaft, a pair of annular rotor packs secured to the ends of the hub, and an electromagnetic coil disposed loosely about the hub between the two rotor packs. Each of the rotor packs has a plurality of axially extending outer teeth formed thereabout which are disposed adjacent to the inner stator teeth. The rotor pack teeth of each of the rotor pole sub-assemblies are angularly offset from one another. The coils are engaged by the stator such that the rotor assembly is free to rotate relative thereto. The coils are sequentially energized and de-energized so as to selectively polarize the associated rotor packs. As they are magnetized, the angularly offset teeth of the rotor packs are attracted toward and repelled from the adjacent teeth of the stator, resulting in rotation of the rotor assembly relative to the stator.

20 Claims, 12 Drawing Sheets

U.S. PATENT DOCUMENTS

| | | |
|---|---|---|
| 4,754,183 | 6/1988 | Gerber . |
| 4,801,831 | 1/1989 | Lewis . |
| 4,859,889 | 8/1989 | Andrews et al. . |
| 4,864,170 | 9/1989 | Eguchi . |
| 4,884,333 | 12/1989 | Cooper et al. . |
| 4,910,475 | 3/1990 | Lin . |
| 4,920,292 | 4/1990 | Albrecht et al. . |
| 4,924,124 | 5/1990 | Kato . |
| 4,954,740 | 9/1990 | Brigham . |
| 4,968,911 | 11/1990 | Denk . |
| 4,992,684 | 2/1991 | Matsui . |
| 5,001,379 | 3/1991 | Katayama . |
| 5,046,154 | 9/1991 | MacManus . |

SYNCHRONOUS INDUCTOR ELECTRIC MOTOR

CROSS REFERENCE TO RELATED APPLICATION

This application is a continuation-in-part of pending application Ser. No. 07/839,200, filed Feb. 20, 1992, and assigned to the assignee of this application.

BACKGROUND OF THE INVENTION

This invention relates in general to electric motors and in particular to an improved structure for a synchronous inductor electric motor.

Electric motors are well known devices which convert electrical energy to rotary mechanical energy. To accomplish this, electric motors establish and control electromagnetic fields so as to cause the desired rotary mechanical motion. There are many different types of electric motors, each utilizing different means for establishing and controlling these electromagnetic fields. Consequently, the operating characteristics of electric motors vary from type to type, and certain types of electric motors are better suited for performing certain tasks than others.

Synchronous motors constitute one principal class of electric motors. The two basic components of a synchronous motor are (1) a stationary member which generates a rotating electromagnetic field, generally referred to as the stator, and (2) a rotatable member driven by the rotating magnetic field, generally referred to as the rotor. Synchronous motors are characterized in that the rotational speed of the rotor is directly related to the frequency of the electrical input signal applied thereto and, therefore, the rotational speed of the electromagnetic field generated thereby. Thus, so long as the frequency of the applied electrical input signal is constant, the rotor will be driven at a constant rotational speed. Within this broad definition, however, the structure and operation of synchronous electric motors vary widely.

One variety of synchronous electric motor is a variable reluctance motor. Variable reluctance motors operate on the principle that a magnetic field which is created about a component formed from a magnetically permeable material will exert a mechanical force on that component. This mechanical force will urge the component to become aligned with the magnetic flux (lines of force) generated by the magnetic field. Thus, by using the stator to establish and rotate a magnetic field about a rotor formed from a magnetically permeable material, the rotor can be driven to rotate relative to the stator. The resistance to the passage of this magnetic flux from the stator to the rotor is referred to as reluctance. The magnitude of this reluctance changes with the rotational position of the rotor relative to the stator. Thus, electric motors of this type are commonly referred to as variable reluctance motors.

In a basic variable reluctance motor structure, this operation can be accomplished by providing a generally hollow cylindrical stator having a plurality of radially inwardly extending poles formed thereon. A winding of an electrically conductive wire is provided about each of the stator poles. Concentrically within the stator, a cylindrical rotor is rotatably supported. The rotor is provided with a plurality of radially outwardly extending poles. However, no electrical conductor windings are provided on the rotor poles. By passing pulses of electrical current through each of the stator windings in a sequential manner, the stator poles can be selectively magnetized so as to attract the rotor poles thereto. Consequently, the rotor will rotate relative to the stator.

Another variety of synchronous electric motor is a synchronous inductor motor. Similar to the variable reluctance motors described above, synchronous inductor motors use the stator to establish and rotate a magnetic field about a rotor formed from a magnetically permeable material. However, rather than rely upon the rotor to move toward a position of minimum reluctance in the presence of this magnetic field, the synchronous inductor motor employs a permanent magnet to polarize the rotor poles. The permanently polarized rotor poles are then attracted and repelled from the selectively polarized stator poles to cause rotation of the rotor relative to the stator. Because this interaction between the two magnetic fields causes rotation of the rotor, synchronous inductor motors function somewhat similarly to conventional induction motors. As a result, synchronous inductor motors are often referred to as hybrid motors, exhibiting certain characteristics of both variable reluctance synchronous motors and induction motors.

To optimize the operation of the either variety of electric motor, the magnitude of the electrical current which is sequentially passed through the stator windings is typically varied as a function of the rotational displacement of the rotor, as opposed to simply being supplied in an on-off manner. For example, the magnitude of the electrical current passed through a particular stator winding can initially be large, but decrease as the rotor pole rotates toward it. Consequently, the stator winding is prevented from continuing to attract the rotor pole toward it when the rotor pole has rotated to a position near or adjacent to the stator pole. This facilitates the rotation of the rotor at a more uniform speed.

When selecting any kind of electric motor for use in a particular application, several basic considerations are important. One such basic consideration is the efficiency of the motor, i.e., the ratio of the mechanical output power (torque in rotary electric motors and force in linear electric motors) to the electrical input power. A second consideration is the maximum amount of torque or force which can be generated by the electric motor. A third consideration is the physical size of the electric motor. Obviously, it would be desirable to increase the efficiency and output torque of an electric motor, while reducing (or at least not increasing) the physical size thereof.

SUMMARY OF THE INVENTION

This invention relates to an improved structure for a synchronous inductor electric motor. The motor includes a hollow stator having a plurality of permanent magnets secured to the inner surface thereof. The magnets are radially polarized in alternating fashion about the inner circumference of the stator. A plurality of radially inwardly extending stator teeth are provided on each of the magnets. The permanent magnets cause the associated stator teeth to exhibit a polar magnetization which is the same as the adjacent radially inner surfaces thereof. A cylindrical rotor assembly is supported concentrically within the stator for rotation relative thereto. The rotor assembly includes a shaft having a plurality of rotor pole sub-assemblies provided thereon. Each of the rotor pole sub-assemblies includes a hub secured to the shaft, a pair of annular rotor packs secured to the ends of the hub, and an electromagnetic coil disposed loosely about the hub between the two rotor packs. Each of the rotor packs has a plurality of axially extending outer teeth formed thereabout which are disposed adjacent to the inner stator teeth. The rotor pack teeth of each of the rotor pole sub-assemblies are angularly offset from one another, preferably by equal amounts. The electromagnetic coils are engaged by the stator such that the rotor assembly is free to rotate relative thereto. The electromagnetic coils are sequentially energized and de-energized so as to selectively polarize the associated rotor packs. As they are magnetized, the angularly offset teeth of the rotor packs are attracted toward and repelled from the adjacent teeth of the stator, resulting in rotation of the rotor assembly relative to the stator.

Various objects and advantages of this invention will become apparent to those skilled in the art from the following detailed description of the preferred embodiments, when read in light of the accompanying drawings.

DETAILED DESCRIPTION OF THE PREFERRED EMBODIMENT

Figure 1:
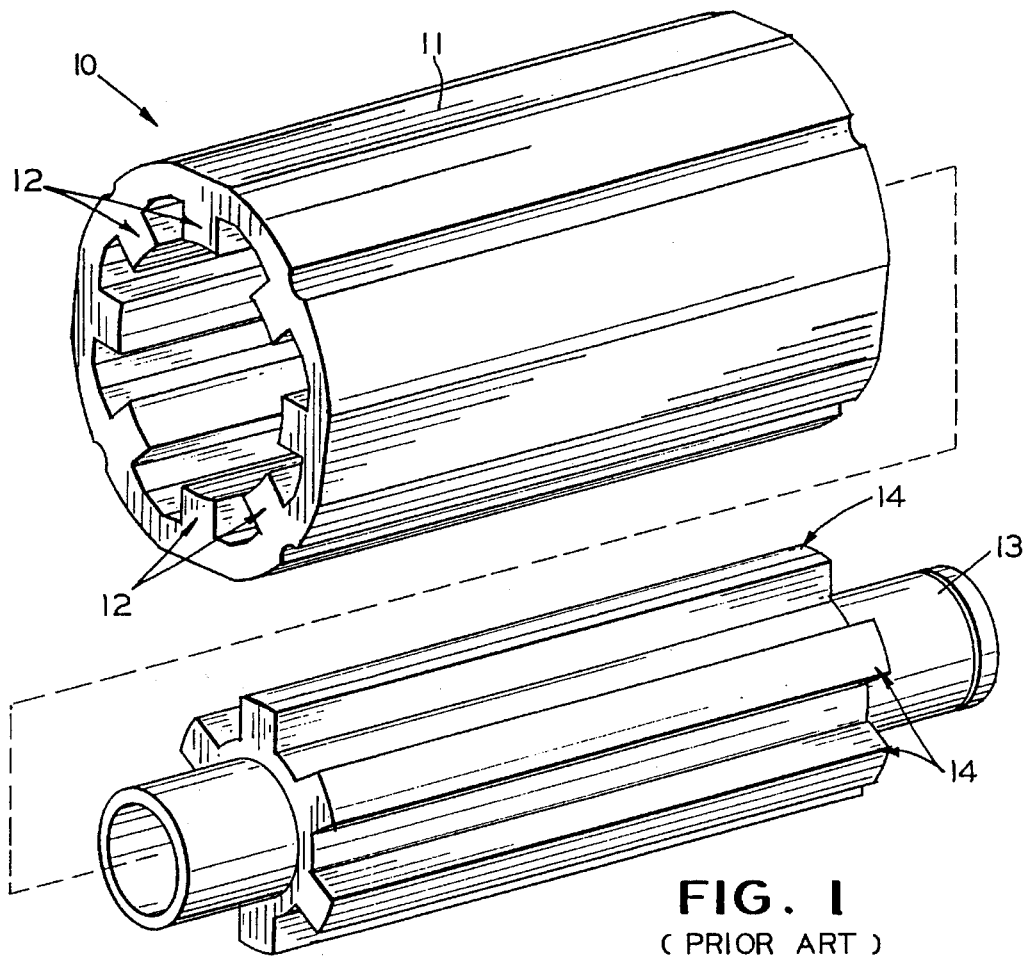
FIG. 1 is an exploded perspective view of a portion of a conventional variable reluctance motor.
Figure 2:
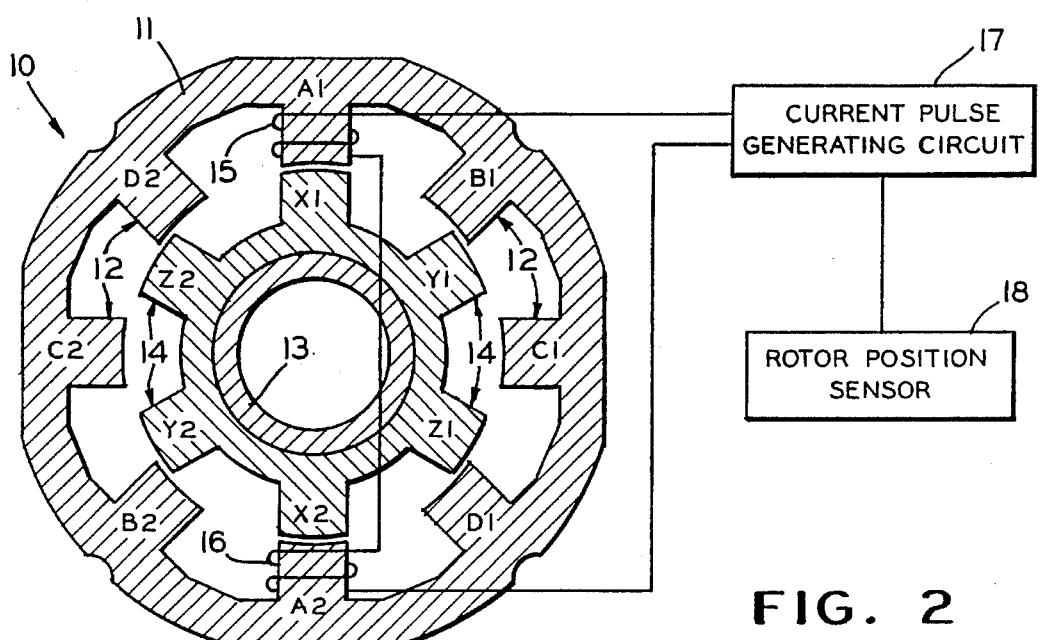
FIG. 2 is a schematic end elevational view of the conventional variable reluctance motor of FIG. 1.
Figure 3:
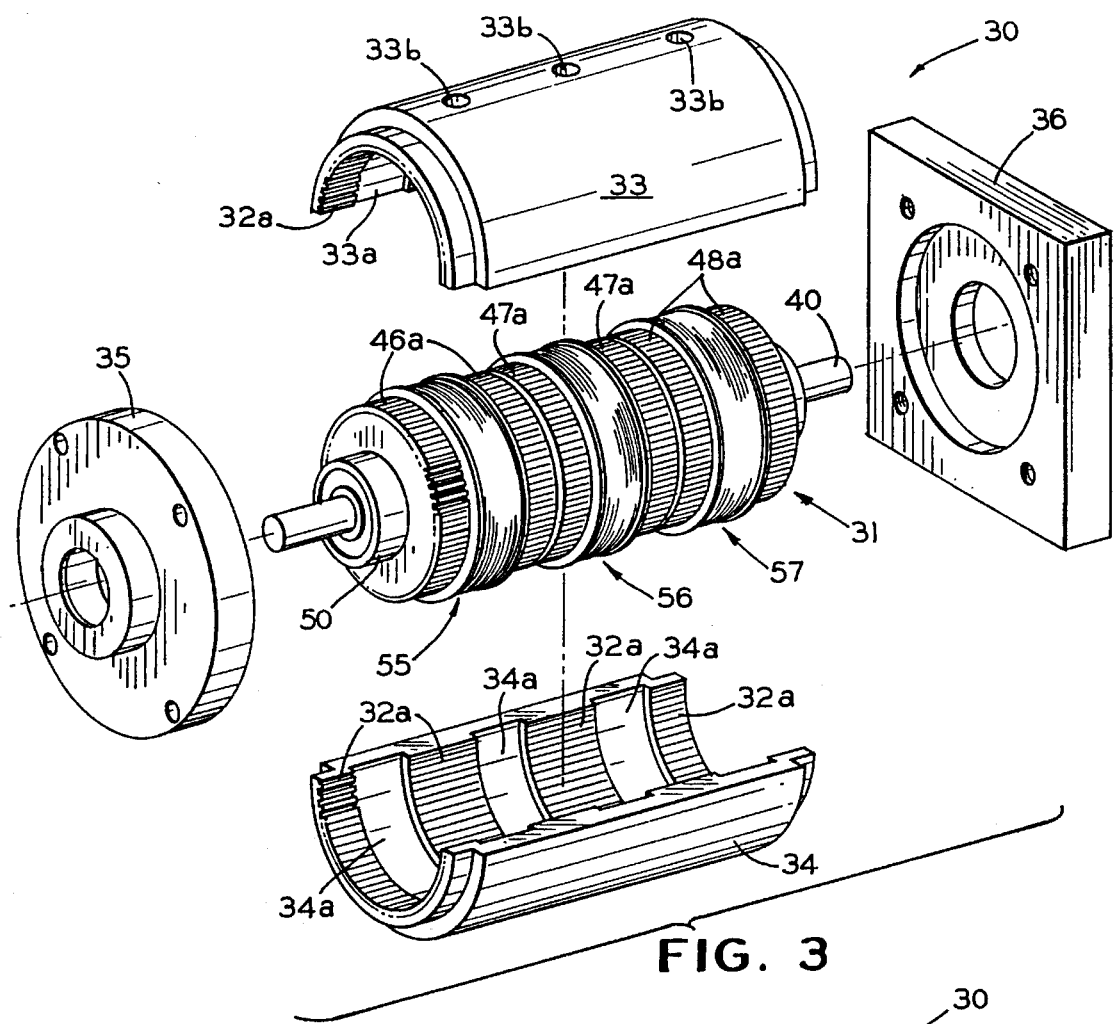
FIG. 3 is an exploded perspective view of a first embodiment of a variable reluctance electric motor in accordance with this invention.

Referring now to the drawings, there is illustrated in FIGS. 1 and 2 a conventional variable reluctance motor, indicated generally at 10. The motor 10 includes a stator 11 which is generally hollow and cylindrical in shape. A plurality of radially inwardly extending poles, indicated generally at 12, are formed on the stator 11 and extend throughout the length thereof. The stator poles 12 are preferably provided in opposed pairs, such as shown at A1 and A2, B1 and B2, C1 and C2, and D1 and D2. Thus, eight stator poles 12 are provided on the illustrated stator 11. However, a greater or lesser number of stator poles 12 may be provided.

Each of the stator poles 12 is generally rectangular in cross sectional shape. The radially innermost surfaces of the stator poles 12 are slightly curved so as to define an inner diameter. The stator 11 and the stator poles 12 are formed from a magnetically permeable material, such as iron. As will be explained below, each of the stator pole pairs A1 and A2, B1 and B2, C1 and C2, and D1 and D2 represents one phase for energizing the variable reluctance motor 10 for operation.

A cylindrical rotor 13 is co-axially supported within the stator 11 for relative rotational movement. The rotor 13 has a plurality of radially outwardly extending poles, indicated generally at 14, formed thereon. As with the stator poles 12, the rotor poles 14 extend longitudinally throughout the length of the rotor 13 and are preferably provided in opposed pairs, such as shown at X1 and X2, Y1 and Y2, and Z1 and Z2. Thus, six rotor poles 14 are provided on the illustrated rotor 13. However, a greater or lesser number of rotor poles 14 may by provided. Generally, the number of rotor poles 14 is different from the number of stator poles 12.

Each of the rotor poles 14 is generally rectangular in cross sectional shape. The radially outermost surfaces of the rotor poles 14 are slightly curved so as to define an outer diameter. The outer diameter defined by the rotor poles 14 is preferably only slightly smaller than the inner diameter defined by the stator poles 12. Thus, the radial gap defined between the stator poles 12 and the rotor poles 14 when they are aligned is relatively small. The rotor 13 and the rotor poles 14 are also formed from a magnetically permeable material, such as iron.

An electrical conductor is wound about each of the stator poles 12. As schematically shown in FIG. 2, a first pair of windings 15 and 16 are provided on the opposed stator poles A1 and A2, respectively. Second, third, and fourth pairs of windings (not shown) are similarly provided on the other stator pole pairs B1 and B2, C1 and C2, D1 and D2. The windings 15 and 16 are connected to an electrical current pulse generating circuit 17, either in series (as illustrated) or in parallel. The current pulse generating circuit 17 is conventional in the art and is adapted to selectively generate pulses of electrical current through the windings 15 and 16. Similar current pulse generating circuits 17 (not shown) are provided for the other pairs of windings on the stator pole pairs B1 and B2, C1 and C2, and D1 and D2.

The timing, magnitude, and polarity of the electrical current pulses generated by the four current pulse generating circuits 17 is determined by the rotational position of the rotor 13 relative to the stator 11. To accomplish this, a conventional sensor 18 is provided which generates a signal which is representative of such relative rotational position. The current pulse generating circuits 17 are responsive to this rotor position signal for generating the current pulses to the various pairs of windings 15 and 16 of the motor 10 in a predetermined manner described below. As a result, the rotor 13 is rotatably driven relative to the stator 11. Alternatively, the rotor position sensor 18 may be omitted, and the current pulse generating circuits 17 may be activated by a conventional phase sequencer (not shown) which operates independently of the rotational position of the rotor 13.

When electrical current is supplied to the windings 15 and 16 by the current pulse generating circuit 17, both the stator 11 and the rotor 13 become magnetized. The windings 15 and 16 are oppositely wound such that stator pole A1 (upon which the winding 15 is disposed) is energized to become a magnetic north pole, while the stator pole A2 (upon which the winding 16 is disposed) is energized become a magnetic south pole. As a result, a magnetic circuit is created between these opposed stator poles A1 and A2. Consequently, magnetic flux (lines of force) are created between the north stator pole A1 and the south stator pole A2. The magnetic flux passes from the north stator pole A1 through the nearest rotor pole X1, through the body of the rotor 13, and from the opposed rotor pole X2 to the south stator pole A2. The magnetic circuit between the north and south stator poles A1 and A2 is completed through the outer annular portion of the stator 11.

The resistance to the passage of magnetic flux from the north stator pole A1 to the nearest rotor pole X1 (and similarly from the south stator pole A2 to the nearest rotor pole X2) is referred to as reluctance, as discussed above. The magnitude of this reluctance changes with the rotational position of the rotor poles 14 relative to the stator poles 12. Reluctance is at a minimum when the rotor poles 14 are radially aligned with the stator poles 12, as with A1, X1 and A2, X2 in FIG. 2. Consequently, the generation of the magnetic circuit described above produces a torque which tends to align the opposed rotor poles X1 and X2 with the energized opposed stator poles A1 and A2, as shown in FIG. 2.

To effect rotation of the rotor 13 relative to the stator 11, the first pair of windings 15 and 16 on the stator poles A1 and A2 is turned off, and the second pair of windings on the stator poles B1 and B2 is turned on. As a result, B1 is energized to become a magnetic north pole, and B2 is energized to become a magnetic south pole. Such energization attracts the nearest rotor poles Y1 and Y2 to become aligned with the energized stator poles B1 and B2. Consequently, the rotor 13 is rotated relative to the stator 11. To continue such rotation of the rotor 13, the stator poles B1 and B2 are de-energized, and the stator poles C1 and C2 are energized. Thus, the rotor poles Z1 and Z2 are attracted to the stator poles C1 and C2. By sequentially energizing the stator poles 12 in this manner, the rotor poles 14 are sequentially attracted thereto. As a result, the rotor 13 rotates relative to the stator 11 in a direction (counterclockwise in the illustrated embodiment) which is opposite to the direction (clockwise in the illustrated embodiment) in which the stator pole pairs A1 and A2, B1 and B2, C1 and C2, and D1 and D2 are energized.

As mentioned above, the timing and magnitude of the pulses of current are controlled in response to the rotational position of the rotor 13 relative to the stator 11. Typically, this means that the current pulse generated to a winding on a particular stator pole 12 will be initially increased to a maximum magnitude, then substantially discontinued before the attracted rotor pole 14 is aligned therewith. For example, the current pulse generated to the first winding can be gradually decreased as the current pulse generated to the next winding is gradually increased. This is done to permit a smooth transition of a rotor pole 14 past an attracting stator pole 12. As a result, the rotor 13 will rotate at a relatively constant speed without stuttering movement from phase to phase.

In the illustrated embodiment, the stator 11 is provided with eight stator poles 12, while the rotor 13 is provided with six rotor poles 14. From the above discussion, it can be seen that each time one of the stator pole pairs A1 and A2, B1 and B2, C1 and C2, and D1 and D2 is energized, the rotor 13 will be rotated fifteen degrees relative to the stator 11. Thus, the stator pole pairs A1 and A2, B1 and B2, C1 and C2, and D1 and D2 must be energized in sequence six times in order to rotate the rotor 13 throughout one complete revolution. Because the rotational speed of the rotor 13 is directly related to the frequency of the current pulses supplied to the stator poles 12, the motor 10 operates as a synchronous motor. By varying the number of stator poles 12 and rotor poles 14, the rotational speed of the rotor 12 can be varied with respect to the frequency of the current pulses supplied to the stator 11. As mentioned above, the structure and operation of this variable reluctance motor 10 is conventional in the art.

Referring now to FIGS. 3 through 7, there is illustrated a first embodiment of an improved structure for a variable reluctance motor, indicated generally at 30, in accordance with this invention. The motor 30 includes a rotor assembly, indicated generally at 31, which is rotatably supported within a generally hollow cylindrical stator, indicated generally at 32, in a manner described below. For reasons which will also be explained below, the illustrated stator 32 is split into upper and lower semi-cylindrical halves 33 and 34.

As best shown in FIGS. 3, 5, 6, and 7, a plurality of stator poles, such as the teeth 32a, are formed on the inner circumferential surfaces of the upper and lower halves 33 and 34 of the stator 32. The teeth 32a extend axially throughout the length of the stator 32. However, the teeth 32a are interrupted by a plurality of circumferentially extending annular recesses 33a and 34a formed in the inner surfaces of the upper and lower halves 33 and 34 of the stator 32. The purpose for these teeth 32a and these recesses 33a and 34a will be also described below.

The teeth 32a may be formed having any desired shape or configuration, and any desired number of teeth 32a may be provided about the inner circumferential surface of the stator 32. In the illustrated embodiment, fifty of such teeth 32a are formed about the inner circumferential surface of the stator 32. A plurality of radially extending apertures 33b are formed through upper stator half 33. The purpose of these apertures 33b will also be explained below.

Figure 4:
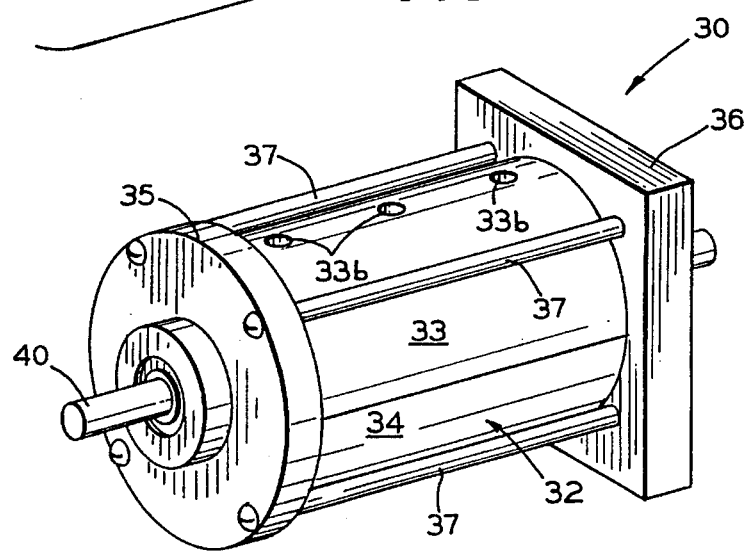
FIG. 4 is a perspective view of the variable reluctance electric motor shown in FIG. 3 shown assembled.
Figure 5:
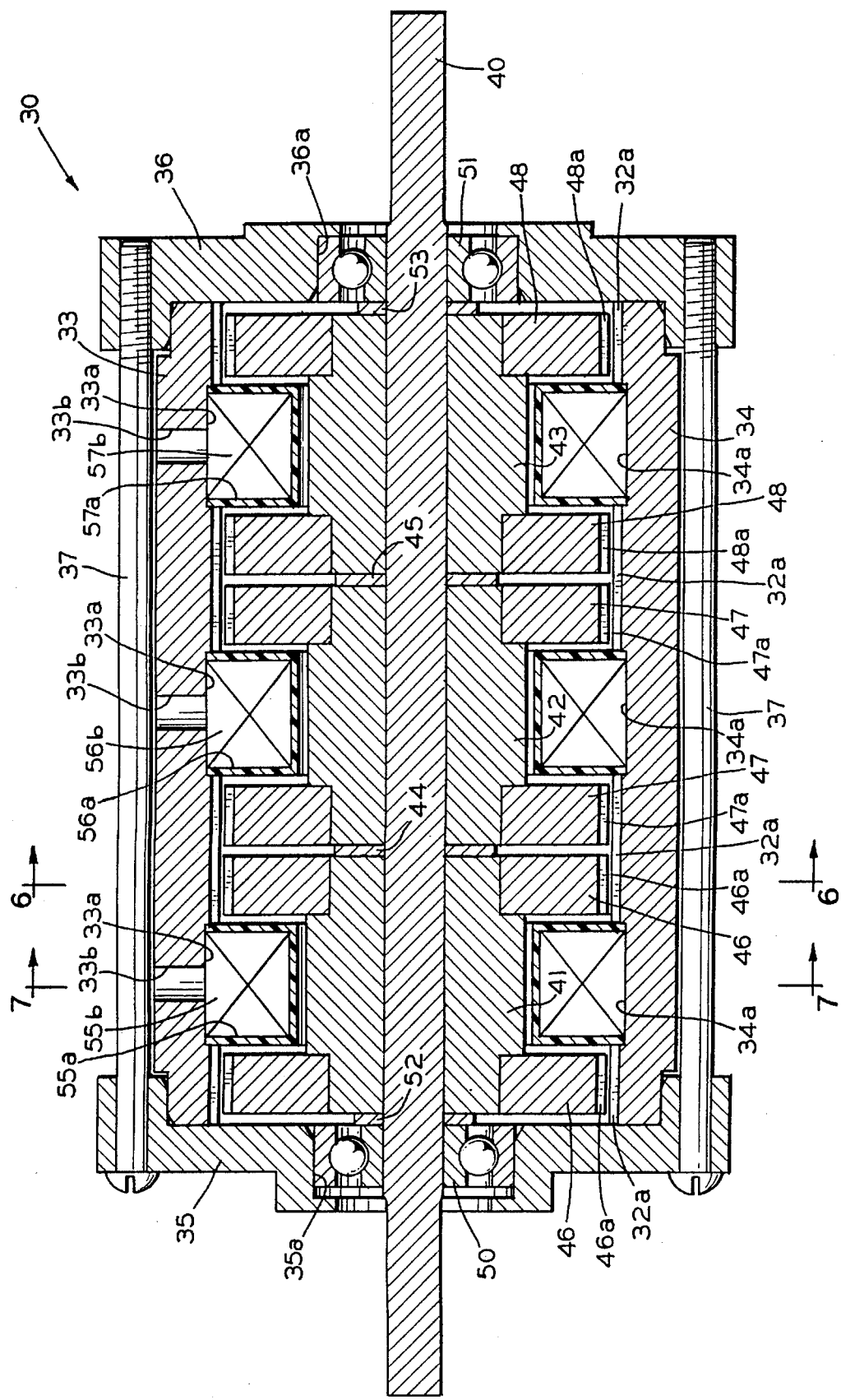
FIG. 5 is a sectional-side elevational view of the assembled variable reluctance electric motor shown in FIG. 4.

The motor 30 further includes a front end bell 35 and a rear end bell 36. The end bells 35 and 36 are provided to retain the upper and lower halves 33 and 34 of the stator 32 together when the components of the motor 30 are assembled, as shown in FIGS. 4 and 5. The end bells 35 and 36 also serve to protectively enclose the ends of the motor 30. A plurality of threaded fasteners 37 extend between the two end bells 35 and 36 to retain them together when the motor 30 is assembled. Thus, the stator 32 can be assembled as shown in FIGS. 4 and 5. Respective recesses 35a and 36a are formed in the end bells 35 and 36 for a purpose which will be explained below.

The stator 32 is formed from a magnetically permeable material, such as iron. The stator 32 can be formed by initially stamping a plurality of laminations from a relatively thin sheet of such magnetically permeable material. Each of these laminations has a cross sectional shape which corresponds to the illustrated hollow cylindrical cross sectional shape of the stator 32. The laminations are then stacked on a fixture so as to be aligned with one another. Adhesive (not shown) is applied between adjacent laminations to prevent them from rotating relative to one another because of torsional forces encountered during use. The adhesive may be applied by means of a conventional vacuum process after all of the laminations have been stacked upon the fixture. Such vacuum impregnation of adhesive is also effective to reduce noise. Alternatively, the adhesive may be individually applied as the laminations are stacked upon one another on the fixture.

In either instance, the adhesive maintains the stack of laminations in alignment so that a plurality of longitudinally extending welds (not shown) can be made along the outer surface of the stack of laminations. Such welding can be performed by known electron beam techniques so as to prevent axial and torsional separation of the laminations. Alternatively, the stator 32 can be secured together by rivets, half blanking, or other conventional means. The stator 32 is preferably constructed in this laminated manner to minimize the generation of eddy currents therein, which can reduce the strength of the electromagnetic field generated thereby. Lastly, the stator 32 is split into the upper and lower halves 33 and 34 by cutting or other means to facilitate assembly of the rotor assembly 31 therein, as will be explained in greater detail below. Alternatively, the stator 32 may be fabricated as described and illustrated in U.S. patent application Ser. No. 08/366,217, filed Dec. 29, 1994, owned by the assignee of this invention.

Figure 6:
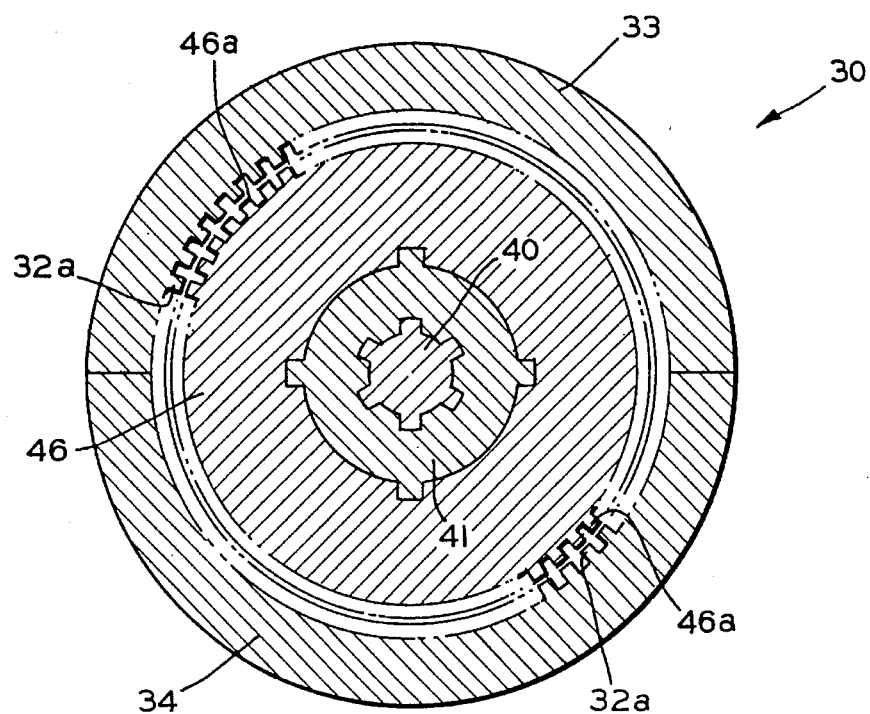
FIG. 6 is a sectional elevational view taken along line 6—6 of FIG. 5.
Figure 7:
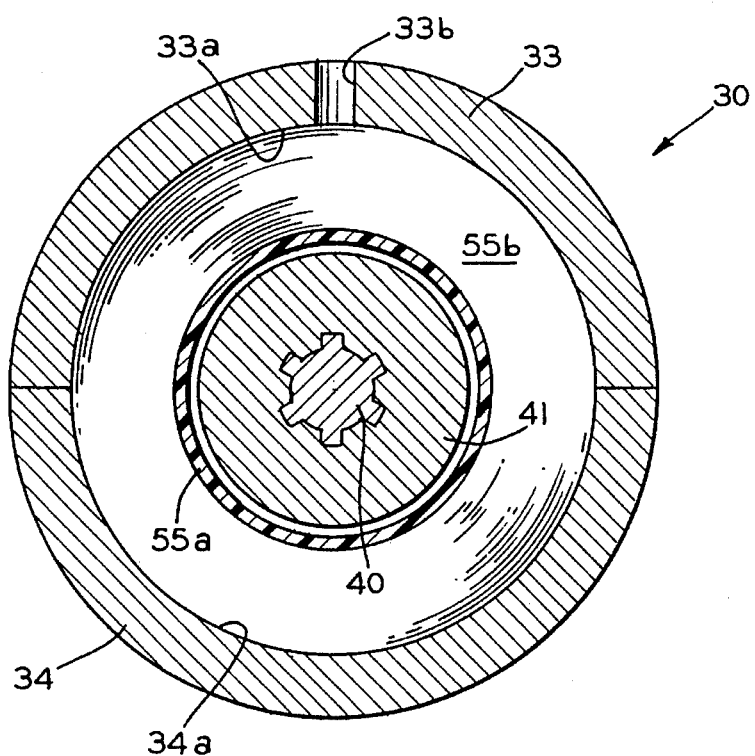
FIG. 7 is a sectional elevational view taken along line 7—7 of FIG. 5.

Referring now to FIGS. 5 through 7, the structure of the rotor assembly 31 will be described in detail. The rotor assembly 31 includes a splined cylindrical shaft 40 which extends throughout the length of the motor 30. The rotor shaft 40 is formed from a non-magnetically permeable material. A plurality of rotor pole sub-assemblies are provided on the rotor shaft 40. Three of such rotor pole sub-assemblies are shown in the illustrated embodiment, although the invention may be practiced with a greater or lesser number. Each of the rotor pole sub-assemblies includes a generally hollow cylindrical hub, as shown at 41, 42, and 43. The hubs 41, 42, and 43 are mounted on the rotor shaft 40 for rotation therewith. As best shown in FIG. 5, the ends of each of the hubs 41, 42, and 43 are formed having reduced outer diameters. Thus, each of the hubs 41, 42, and 43 is defined by a larger diameter central portion which is disposed between two smaller diameter end portions. The outer surfaces of the smaller diameter end portions of the hubs 41, 42, and 43 are splined, for a purpose which will be explained below.

As with the stator 32, the hubs 41, 42, and 43 are formed from a magnetically permeable material, such as iron. The hubs 41, 42, and 43 can be formed in the same manner as described above with respect to the stator 32. The hubs 41, 42, and 43 are provided with inner splines which cooperate with the outer splines on the rotor shaft 40 for rotation therewith. A first spacer 44 can be mounted on the shaft 40 between the first hub 41 and the second hub 42 to space them apart from one another. Similarly, a second spacer 45 can be mounted on the shaft 40 between the second hub 42 and the third hub 43 to space them apart from one another. The spacers 44 and 45 are preferably formed from a non-magnetically permeable material. Then, the hubs 41, 42, and 43 can be secured to the shaft 40 by adhesive or other means so as to prevent axial movement thereof relative to the rotor shaft 40 during use.

Each of the rotor pole sub-assemblies further includes a pair of rotor packs mounted on the associated hub. Thus, as best shown in FIG. 5, a first pair of rotor packs 46 is mounted on the opposed reduced diameter end portions of the first hub 41. The first rotor packs 46 are identical in structure, each being formed generally in the shape of a spur gear having a plurality of rotor poles, such as the teeth 46a, formed about the periphery thereof. Preferably, the number of teeth 46a formed on the first rotor packs 46 is equal to the number of teeth 32a provided about the inner circumferential surface of the stator 32. Thus, in the illustrated embodiment, fifty of such teeth 46a are provided on each of the first rotor packs 46. The first rotor packs 46 are mounted on the first hub 41 such that the teeth 46a thereof are angularly aligned with one another.

As with the hubs 41, 42, and 43, the rotor packs 46 are formed from a magnetically permeable material, such as iron. The rotor packs 46 can be formed in the same manner as described above with respect to the stator 32. The rotor packs 46 are provided with inner splines which cooperate with the outer splines on the outer surfaces of the reduced diameter end portions of the hub 41 for rotation therewith. Then, the rotor packs 46 can be secured to the hub 41 by adhesive or other means so as to prevent axial movement relative thereto during use.

Similarly, second and third pairs of rotor packs 47 and 48 are mounted on the reduced diameter end portions of the hubs 42 and 43, respectively, of the other rotor pole sub-assemblies. The structures of the second and third pairs of rotor packs 47, and 48 are identical to the first pair of rotor packs 46. Accordingly, the second rotor packs 47 have teeth 47a formed thereon which are angularly aligned with one another, and the third rotor packs 48 have teeth 48a formed thereon which are angularly aligned with one another. Preferably, the rotor packs 47 and 48 have the same number of teeth 47a and 48a as the number of teeth 46a formed on the first rotor packs 46, i.e., fifty in the illustrated embodiment.

The teeth 46a, 47a, and 48a respectively formed on the pairs of rotor packs 46, 47, and 48 are not angularly aligned with one another. Rather, the rotor packs 46, 47, and 48 are oriented on their respective hubs 41, 42, and 43 such that the teeth 46a, 47a, and 48a thereof are angularly offset from one another, preferably by equal amounts. The magnitude of this angular offset can be calculated by dividing the circumference of the rotor assembly 31 (360°) by the number of teeth in each of the rotor packs 46, 47, and 48 (fifty), and further by the number of the rotor pole sub-assemblies (three), which yields 2.4°. Thus, in the illustrated embodiment, the teeth 47a of the second pair of rotor packs 47 are angularly offset from the teeth 46a of the first pair of rotor packs 46 by 2.4°. Similarly, the teeth 48a of the third pair of rotor packs 48 are angularly offset from the teeth 47a of the second pair of rotor packs 47 by 2.4°. Finally, the teeth 46a of the first pair of rotor packs 46 are angularly offset from the teeth 48a of the third pair of rotor packs 48 by 2.4°.

Lastly, each of the rotor pole sub-assemblies includes an electromagnetic coil mounted on the associated hub. Thus, as best shown in FIG. 5, a first electromagnetic coil, indicated generally at 55, is disposed about the central portion of the hub 41 between the two rotor packs 46. The electromagnetic coil 55 is conventional in the art and includes an annular bobbin 55a having a generally U-shaped cross section. An electrically conductive wire is repeatedly wound about the bobbin 55a to form a winding 55b. Similar electromagnetic coils 56 and 57 are disposed about the hubs 42 and 43, respectively, of the second and third rotor pole sub-assemblies. The electromagnetic coil 56 includes an annular bobbin 56a having a winding 56b, and the electromagnetic coil 57 includes an annular bobbin 57a having a winding 57b.

As mentioned above, the rotor assembly 31 is enclosed by the upper and lower halves 33 and 34 of the stator 32 and the front and rear end bells 35 and 36 when assembled. The rotor assembly 31 is mounted for rotation within the stator 32 by a pair of bearings 50 and 51. The first bearing 50 is mounted on the front end of the shaft 40 adjacent to the hub 41. A third spacer 52 is mounted on the shaft 40 between the first bearing 50 and the hub 41 to space them apart from one another. Similarly, the second bearing 51 is mounted on the rear end of the shaft 40 adjacent to the hub 43. A fourth spacer 53 is mounted on the shaft 40 between the second bearing 51 and the hub 43 to space them apart from one another. The bearings 50 and 51 are supported in the recesses 35a and 36a respectively formed in the front and rear end bells 35 and 36. Thus, when the motor 30 is assembled as shown in FIGS. 4 and 5, the rotor assembly 31 is supported for relative rotation within the stator 32. The spacers 52 and 53 are preferably formed from a non-magnetically permeable material.

As best shown in FIG. 5, the inner diameters of the bobbins 55a, 56a, and 57a are somewhat larger than the outer diameter of the central portions of the associated hubs 41, 42, and 43. As a result, the electromagnetic coils 55, 56, and 57 are not secured to the hubs 41, 42, and 43 for rotation with the rotor assembly 31. Rather, the hubs 41, 42, and 43 (as well as the rotor shaft 40) are able to rotate freely with respect to the electromagnetic coils 55, 56, and 57. The outer diameters of the bobbins 55a, 56a, and 57a are sized to fit snugly in the aligned annular recesses 33a and 34a formed in the upper and lower halves 33 and 34 of the stator 32. Thus, when the motor 30 is assembled as shown in FIG. 5, the electromagnetic coils 55, 56, and 57 are frictionally engaged by or otherwise secured to the inner circumferential surface of the stator 32 and positioned concentrically about the rotor assembly 31.

The electromagnetic coils 55, 56, and 57 are connected to respective electrical current pulse generating circuits (not shown), such as shown in FIG. 2. This connection is accomplished by passing the two ends of each of the windings 55b, 56b, and 57b through the respective radially extending apertures 33b formed through the upper stator half 33. The current pulse generating circuits are conventional in the art and are adapted to selectively generate pulses of electrical current to the electromagnetic coils 55, 56, and 57. The timing and magnitude of the electrical current pulses generated by the current pulse generating circuits are determined by the rotational position of the rotor assembly 31 relative to the stator 32.

To accomplish this, a conventional sensor (not shown) is provided which generates a signal which is representative of such relative rotational position. The current pulse generating circuits are responsive to this rotor assembly position signal for generating the current pulses to the electromagnetic coils 55, 56, and 57. As will be described in detail below, the pulses of electrical current are sequentially supplied to the windings 55b, 56b, and 57b of the electromagnetic coils 55, 56, and 57 to cause the rotor assembly 31 to rotate relative to the stator 32.

In operation, the first current pulse generating circuit is initially activated to generate a pulse of electrical current to the winding 55b of the first electromagnetic coil 55. When the first winding 55b is turned on in this manner, a magnetic circuit is created. The magnetic flux of this magnetic circuit flows axially in one direction through the hub 41 to one of the rotor packs 46, radially outwardly across the air gap defined between the rotor pack teeth 46a to the adjacent stator teeth 32a, axially in the opposite direction through the stator 32, radially inwardly across the air gap defined between the stator teeth 32a and the teeth 46a of the other rotor pack 46, and axially back into the hub 41. As a result of this magnetic circuit, a torque is produced which tends to align the rotor pack teeth 46a radially with the stator teeth 32a. Thus, the rotor assembly 31 is oriented relative to the stator 32 similar to the rotor 13 and the stator 11 shown in FIG. 2.

To effect rotation of the rotor assembly 31 relative to the stator 32, the winding 55b of the first electromagnetic coil 55 is turned off, and the winding 56b of the second electromagnetic coil 56 is turned on. As a result, a similar magnetic circuit is created through the second hub 42, its associated rotor packs 47, and the stator 32 by such energization. Because the teeth 47a of the second rotor packs 47 are angularly offset from the teeth of the first rotor packs 46a (by 2.4°, as discussed above), the energization of the second winding 47a causes the rotor assembly 31 to be rotated relative to the stator 32 so as to align the rotor pack teeth 46a radially with the stator teeth 32a. In a like manner, the second winding 47a is subsequently turned off and the third winding 48a is turned on to complete one cycle of operation of the motor 30.

As mentioned above, the magnitude of the electrical current which is sequentially passed through each of the windings 55b, 56b, and 57b is typically varied as a function of the rotational displacement of the rotor assembly 31. This is done to optimize the operation of the variable reluctance motor 10. For example, the magnitude of the electrical current passed through the first winding 55b can initially be large, but decrease as the rotor pack teeth 46a rotate toward becoming radially with the stator teeth 32a. As the magnitude of this electrical current is decreased, the second winding 56b can be turned on. Thus, the windings 55b, 56b, and 57b can be turned on and off in overlapping fashion to facilitate the rotation of the rotor assembly 31 at a more uniform speed.

As mentioned above, fifty teeth 46a, 47a, and 48a are respectively provided on each of the rotor packs 46, 47, and 48. Furthermore, such teeth 46a, 47a, and 48a are angularly offset from one another by 2.4°. Thus, each time one of the electromagnetic coils 55, 56, and 57 is turned on, the rotor assembly 31 is rotated 2.4° relative to the stator 32. Therefore, fifty cycles of operation (i.e., fifty sequential energizations of the electromagnetic coils 55, 56, and 57) is required to rotate the rotor assembly 31 one complete revolution. Because the rotational speed of the rotor assembly 31 is directly related to the frequency of the electric current pulses applied to the electromagnetic coils 55, 56, and 57, the motor 30 is a synchronous electric motor.

Figure 8:
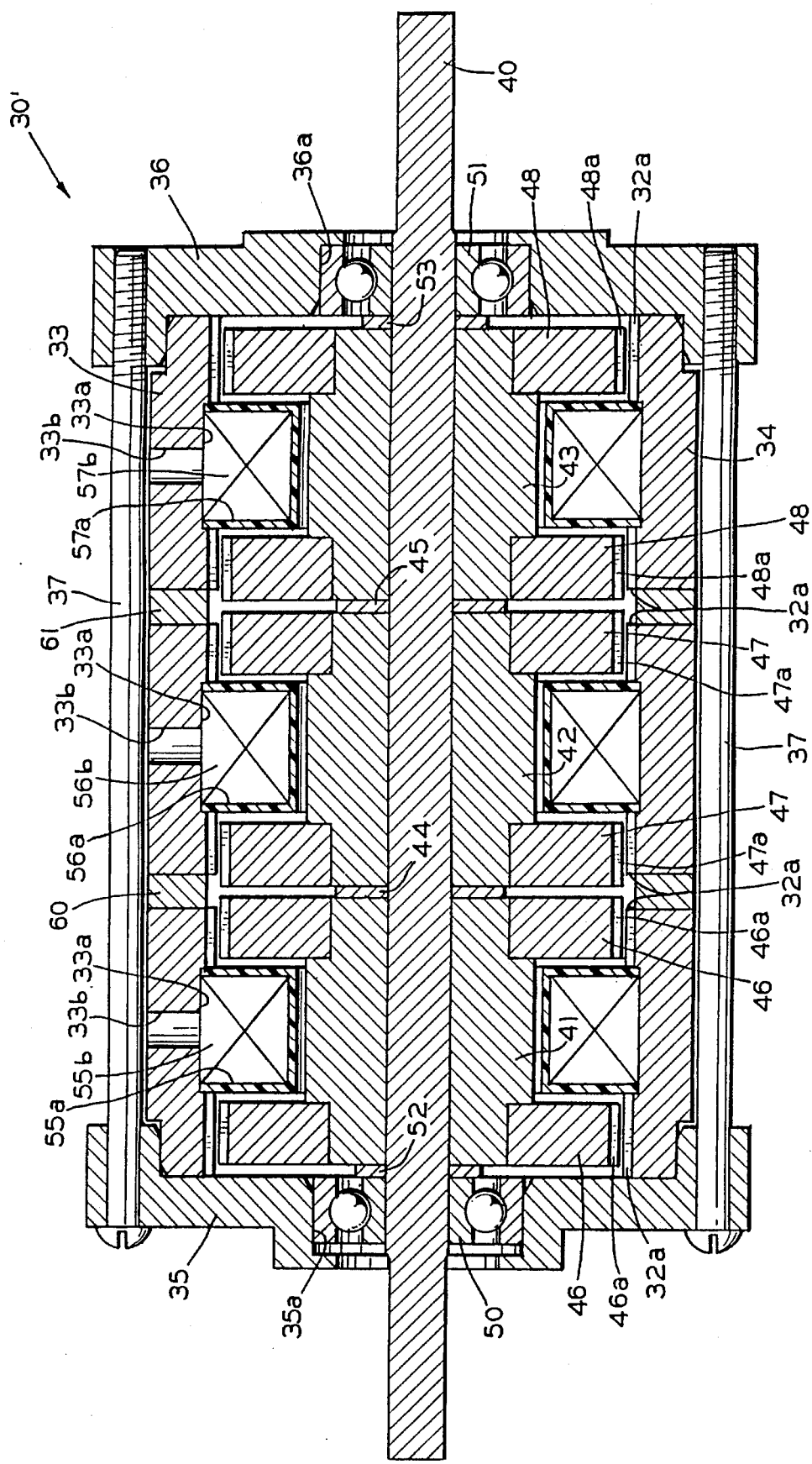
FIG. 8 is a sectional side elevational view similar to FIG. 5 of a second embodiment of a variable reluctance electric motor in accordance with this invention.

Referring now to FIG. 8, there is illustrated a second embodiment of a motor 30' in accordance with this invention. The structure of the motor 30' is generally the same as the motor 30 discussed above, and like reference numbers have been used to indicate similar components. The stator 32 of the previously described motor 30 was essentially continuous throughout its entire axial length. In this embodiment, the stator 32' of the motor 30' is formed having a pair of annular spacers 60 and 61. The spacers 60 and 61 are formed integrally with the stator 32' and are located axially between the adjacent rotor pole assemblies. The spacers 60 and 61 are formed from a non-magnetically permeable material which substantially blocks the passage of magnetic flux therethrough.

The spacers 60 and 61 function to interrupt any magnetic flux which may flow axially through the stator 32' from one of the rotor pole sub-assemblies to another. As a result, the rotor pole sub-assemblies function essentially independently of one another. For example, when the first electromagnetic coil 55 is turned on, the magnetic circuit created thereby will extend essentially only across the teeth 46a of the first rotor packs 46 and those portions of the teeth 32a of the stator 32 which are located directly radially outwardly therefrom. Little attractive force will be generated between the stator teeth 32a and the teeth 47a and 48a of the other rotor packs 47 and 48. Such other attractive force would adversely affect the operation of the motor 10.

Figure 9:
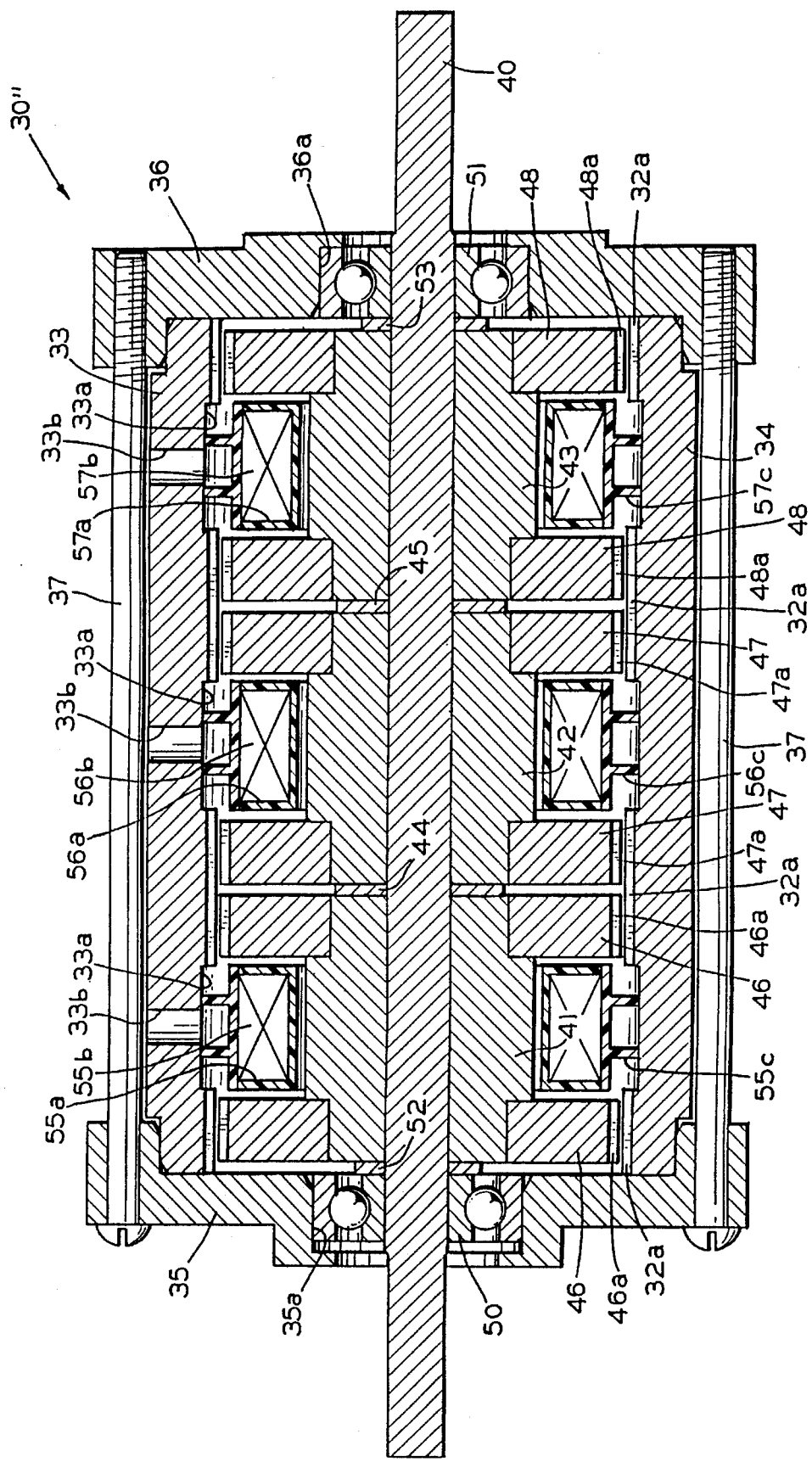
FIG. 9 is a sectional side elevational view similar to FIG. 5 of a third embodiment of a variable reluctance electric motor in accordance with this invention.

Referring now to FIG. 9, there is illustrated a third embodiment of a motor 30" in accordance with this invention. The structure of the motor 30" is generally the same as the motor 30 discussed above, and like reference numbers have been used to indicate similar components. In this embodiment, the motor 30" is provided with radially extending support arms 55c, 56c, and 57c. The support arms 55c, 56c, and 57c extend between the stator 32 and each of the bobbins 55a, 56a, and 57a of the electromagnetic coils 55, 56, and 57, respectively. The support arms 55c, 56c, and 57c support the electromagnetic coils 55, 56, and 57 within the stator 32, as opposed to the frictional engagement disclosed above. The support arms 55c, 56c, and 57c may be formed integrally with the bobbins 55a, 56a, and 57a and may be secured to the stator 32 in any desired manner.

Figure 10:
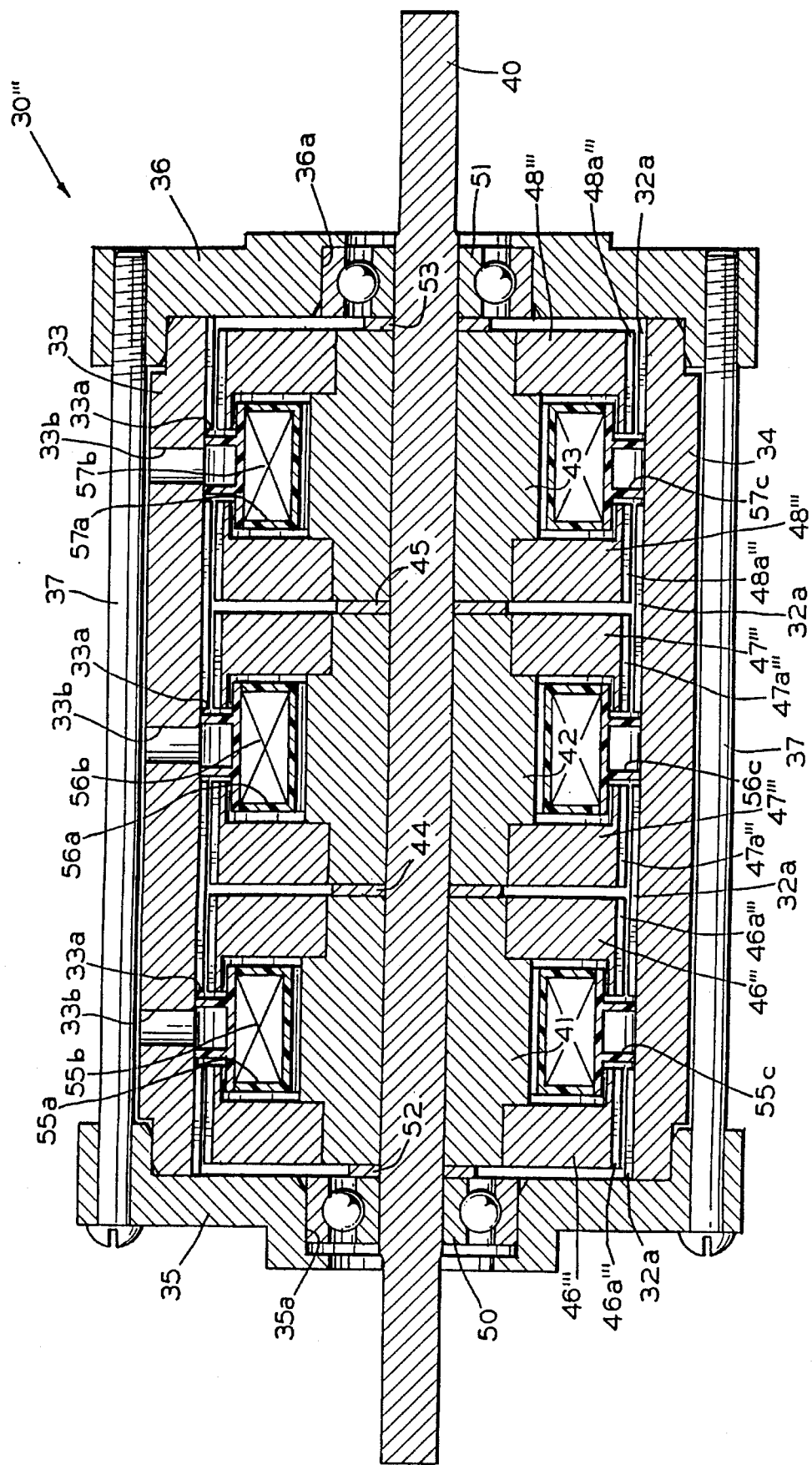
FIG. 10 is a sectional side elevational view similar to FIG. 5 of a fourth embodiment of a variable reluctance electric motor in accordance with this invention.

Referring now to FIG. 10, there is illustrated a fourth embodiment of a motor 30''' in accordance with this invention. The structure of the motor 30''' is generally the same as the motor 30" discussed above, and like reference numbers have been used to indicate similar components. In this embodiment, the rotor packs 46''' are formed having portions which extend axially over the ends of the associated electromagnetic coil 55. Thus, the teeth 46a''' of the rotor packs 46''' are axially longer than the teeth 46a of the previously discussed rotor packs 46. Because of this, the effective force generated by the energization of the electromagnetic coil 55 may be greater than with the previously described embodiments. The other rotor packs 47''' and 48''' have the same structure as the rotor packs 46'''.

Figure 11:
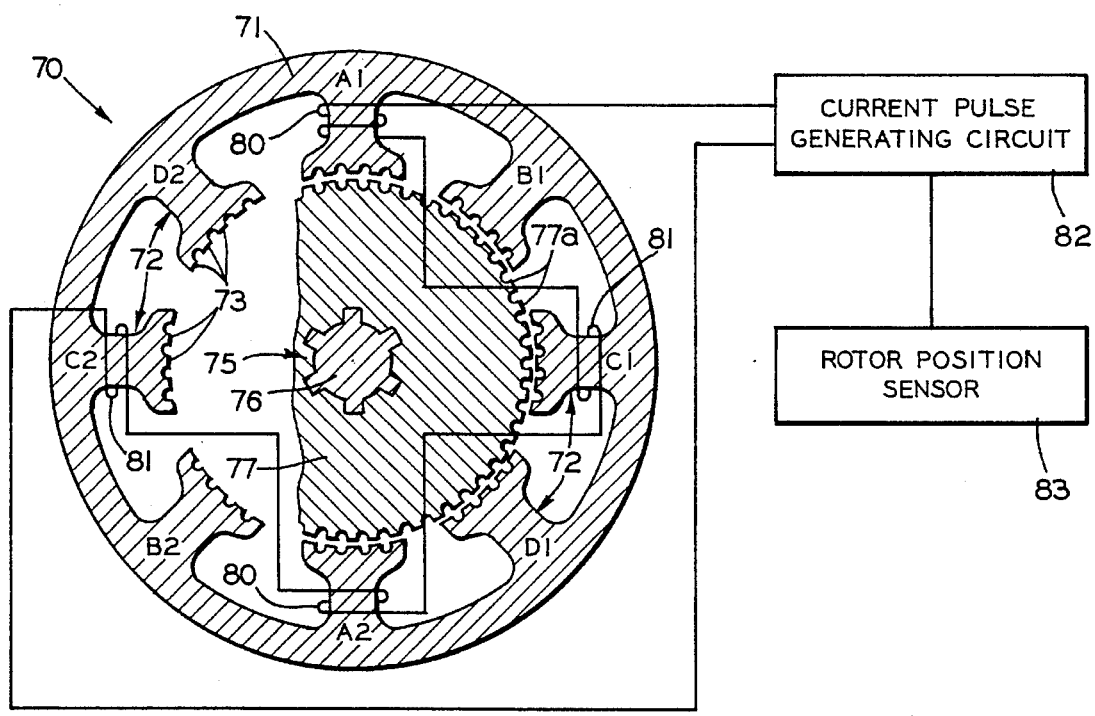
FIG. 11 is a schematic sectional end elevational view of a conventional synchronous inductor motor.
Figure 12:
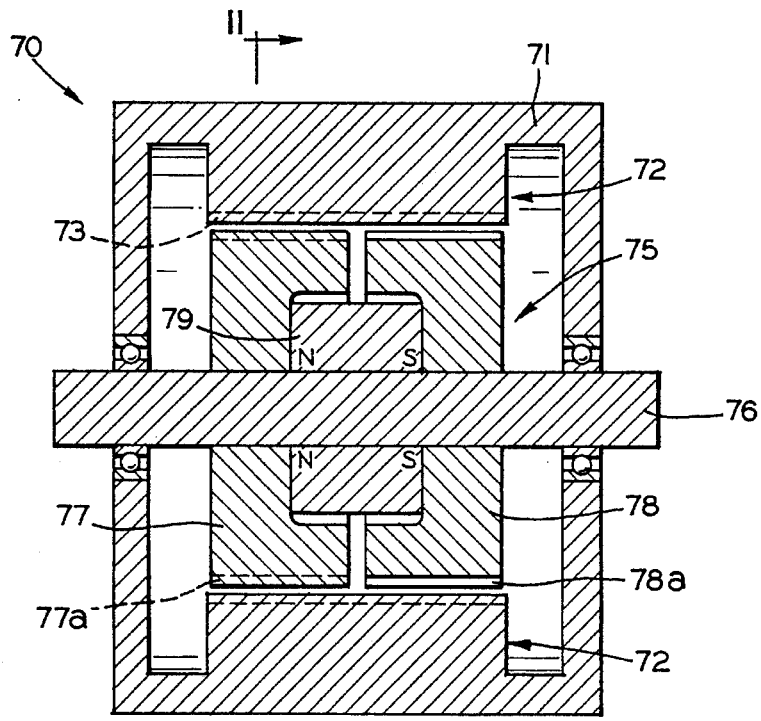
FIG. 12 is a sectional side elevational view of the conventional synchronous inductor motor illustrated in FIG. 11.

Referring now to FIGS. 11 and 12, there is illustrated a conventional synchronous inductor motor, indicated generally at 70. The motor 70 includes a stator 71 which is generally hollow and cylindrical in shape. A plurality of radially inwardly extending stator poles, indicated generally at 72, are formed on the stator 71 and extend throughout the length thereof. The stator poles 72 are preferably provided in opposed pairs, such as shown at A1 and A2, B1 and B2, C1 and C2, and D1 and D2. Thus, eight stator poles 72 are provided on the illustrated stator 71. However, a greater or lesser number of stator poles 72 may be provided.

Each of the stator poles 72 is generally rectangular in cross sectional shape. A plurality of teeth 73 (five in the illustrated embodiment) is provided on the radially innermost surface of each of the stator poles 72. The stator teeth 73 extend longitudinally throughout the associated stator poles 72. The stator 71 and the stator poles 72 are formed from a magnetically permeable material, such as iron. As will be explained below, the stator pole pairs A1, A2, and C1, C2 represent a first phase for energizing the synchronous inductor motor for operation, while the stator pole pairs B1, B2, and D1, D2 represent a second phase for energizing the synchronous inductor motor for operation.

A cylindrical rotor assembly, indicated generally at 75, is co-axially supported within the stator 71 for relative rotational movement. The rotor assembly 75 includes a shaft 76 having a first rotor section 77 secured for rotation therewith. The first rotor section 77 has a plurality of radially outwardly extending teeth 77a (fifty in the illustrated embodiment) formed on the outer surface thereof. Similarly, the rotor assembly 75 also includes a second rotor section 78 secured for rotation therewith. The second rotor section 78 has a plurality of radially outwardly extending teeth 78a (also fifty in the illustrated embodiment) formed on the outer surface thereof. The first and second rotor sections 77 and 78 are both formed from a magnetically permeable material, such as iron.

Preferably, the teeth 73 provided on the stator 71, the teeth 77a provided on the first rotor section 77, and the teeth 78a provided on the second rotor section 78 are all formed having the same size and pitch. However, the teeth 77a provided on the first rotor section 77 are not axially aligned with the teeth 78a provided on the second rotor section 78. Rather, the teeth 77a provided on the first rotor section 77 are offset from the teeth 78a provided on the second rotor section 78 by one-half tooth pitch. Thus, as shown in FIGS. 11 and 12, when the teeth 77a provided on the first rotor section 77 are aligned with the teeth 73 provided on the stator 71, the teeth 78a provided on the second rotor section 78 are aligned with the valleys between the teeth 73 provided on the stator 71.

A permanent magnet 79 is mounted on the rotor shaft 76 between the first rotor section 77 and the second rotor section 78. As can be readily appreciated from FIG. 12, the permanent magnet 79 causes the entire first rotor section 77 to exhibit a north polar magnetization. The magnet 79 further causes the entire second rotor section 78 to exhibit a south polar magnetization.

An electrical conductor is wound about each of the stator poles 72. As schematically shown in FIG. 11, first pairs of windings 80 and 81 are provided on the opposed stator pole pairs A1, A2 and C1, C2, respectively. The windings 80 and 81 are connected to an electrical current pulse generating circuit 82, either in series (as illustrated) or in parallel. The current pulse generating circuit 82 is conventional in the art and is adapted to selectively generate pulses of electrical current through the windings 80 and 81. Second pairs of windings (not shown) are similarly provided on the other stator pole pairs B1, B2 and D1, D2, and a similar current pulse generating circuit (not shown) may be provided therefor. The timing, magnitude, and polarity of the electrical current pulses generated by the two current pulse generating circuits may, if desired, be determined by a conventional rotor position sensor 83, as described above.

When electrical current is supplied to the windings 80 and 81 by the current pulse generating circuit 82, the stator 71 becomes magnetized. The pairs of windings 80 and 81 are wound in the opposite direction such that when they are energized, both the teeth 73 of the stator poles A1, A2 (upon which the windings 80 are disposed) and the teeth 73 of the stator poles C1, C2 (upon which the windings 81 are disposed) exhibit the opposite polar magnetization. The other pairs of windings on the other stator pole pairs B1, B2, and D1, D2 are similarly wound.

In operation, assume that electrical current is supplied to the windings 80 provided on the stator poles A1 and A2 so as to energize the teeth 73 thereon to become magnetic south poles. As a result, the teeth 77a of the first rotor section 77 (which, because of the permanent magnet 79, are magnetic north poles) are attracted toward the adjacent stator teeth 73 provided on the stator poles A1 and A2. Thus, the rotor assembly 75 is attracted to rotate toward the rotational position illustrated in FIG. 11. The teeth 78a of the second rotor section 78 (which, because of the permanent magnet 79 are magnetic north poles) are repelled from the adjacent stator teeth 73 provided on the stator poles A1 and A2. However, as described above, the teeth 78a of the second rotor section 78 are offset from the teeth 77a of the first rotor section 77. Thus, the rotor assembly 75 is simultaneously repelled to rotate toward the rotational position illustrated in FIG. 11 by the second rotor section 78.

At the same time, electrical current is supplied to the windings 81 provided on the stator poles C1 and C2 so as to energize them to become magnetic north poles. As a result, the teeth 77a of the first rotor section 77 (which, because of the permanent magnet 79, are magnetic north poles) are repelled from the adjacent stator teeth 73 provided on the stator poles C1 and C2. Similarly, the teeth 78a of the second rotor section 78 (which, because of the permanent magnet 79, are magnetic north poles) are attracted to the adjacent stator teeth 73 provided on the stator poles C1 and C2. Thus, the first and second rotor sections 77 and 78 are respectively repelled from and attracted toward the stator poles C1 and C2 in the same manner as described above with respect to the stator poles A1 and A2. Thus, the rotor assembly 75 is moved to the rotational position illustrated in FIG. 11. Throughout this initial energization, no electrical current is supplied to the stator poles pairs B1, B2 and D1, D2.

Subsequently, the stator pole pairs A1, A2 and C1, C2 are de-energized, the stator pole pair B1, B2 is energized to become magnetic south poles, and the stator pole pair D1, D2 is energized to become magnetic north poles. Because of the same magnetic attractions and repulsions described above, the rotor assembly 75 is rotated counter-clockwise one-quarter of a rotor tooth pitch from the position illustrated in FIG. 11. Similarly, in the next step, the stator pole pair A1, A2 is energized to become magnetic north poles, the stator pole pair B1, B2 is de-energized, the stator pole pair C1, C2 is energized to become magnetic south poles, and the stator pole pair D1, D2 is de-energized. In this manner, clockwise rotation of the electromagnetic field generated by the stator 71 causes counter-clockwise rotation of the rotor assembly 75.

Referring now to FIGS. 13 through 16, there is illustrated an improved structure for a synchronous inductor motor, indicated generally at 100, in accordance with this invention. The motor 100 includes a rotor assembly, indicated generally at 101, which is rotatably supported within a generally hollow cylindrical stator, indicated generally at 102, by a pair of bearings 103 and 104. As with the variable reluctance electric motor 30 described above, the illustrated stator 102 is split into upper and lower semi-cylindrical halves 105 and 106. A pair of end bells 107 and 108 are provided for closing the longitudinal ends of the stator 102. The end bells 107 and 108 support the bearings 103 and 104 therein which, in turn, rotatably support the ends of the rotor assembly 101. Also, as will be described below, the end bells 107 and 108 are supported on the ends of the stator 102.

A plurality of permanent magnets are attached to the inner surfaces of the upper and lower halves of the stator. In the embodiment illustrated in FIGS. 13 and 16, a first circumferential array of four magnets 110, 111, 112, and 113 is secured adjacent one longitudinal end of the stator 102, two on each of the upper and lower halves 105 and 106. Each of the magnets 110, 111, 112, and 113 is generally flat and rectangular in shape, but is curved to correspond to the radius of curvature of the inner surfaces of the upper and lower halves 105 and 106. The magnets 110, 111, 112, and 113 are radially polarized in alternating fashion about the inner circumference of the stator. Thus, the radially inner surfaces of the opposed magnets 110 and 112 and are magnetic south poles, while the radially outer surfaces of such opposed magnets 110 and 112 are magnetic north poles. Similarly, the radially inner surfaces of the other opposed magnets 111 and 113 are magnetic north poles, while the radially outer surfaces of such opposed magnets 111 and 113 are magnetic south poles.

Figure 16:
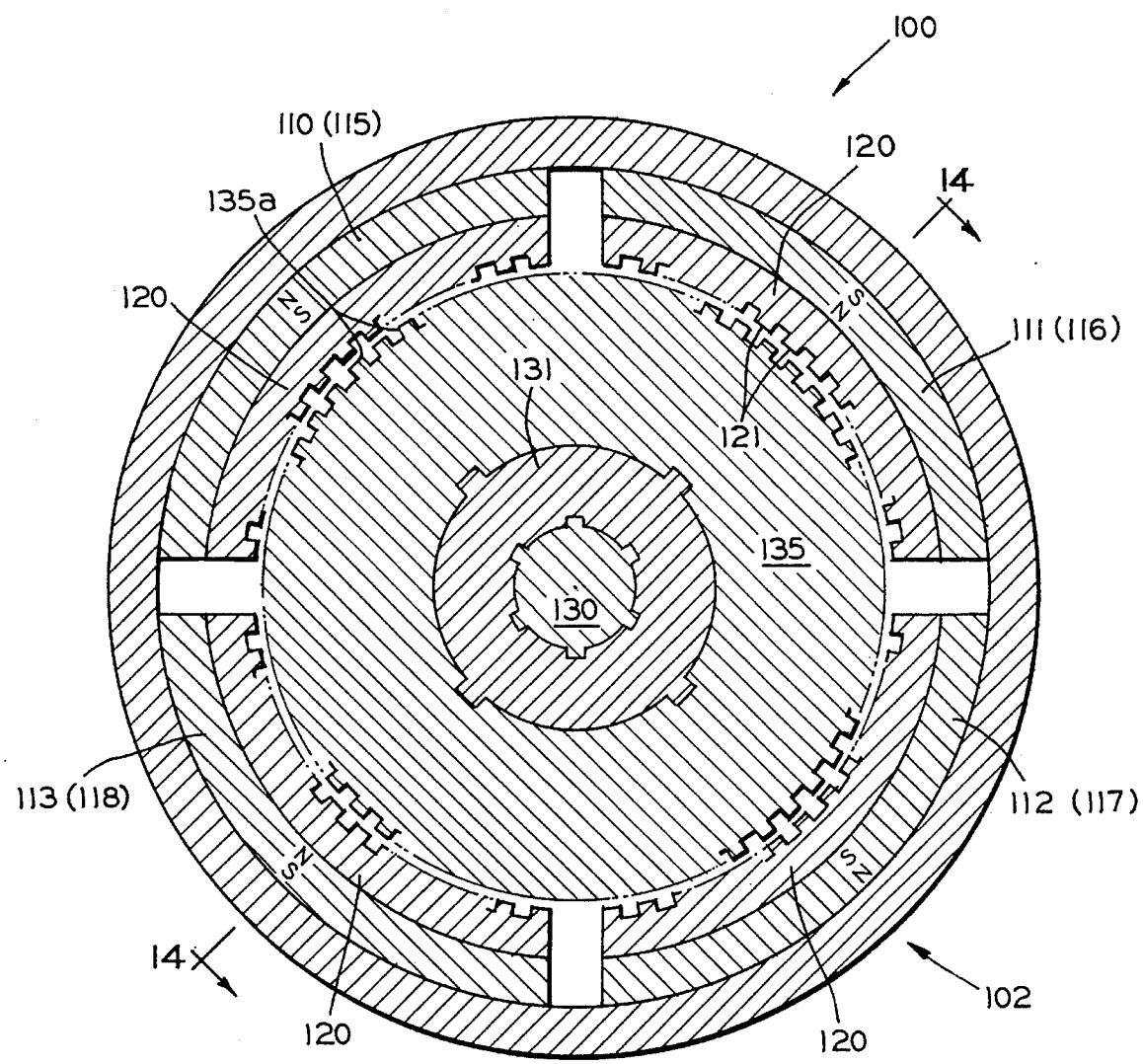
FIG. 16 is a sectional elevational view taken along line 16—16 of FIG. 14.

A second circumferential array of four magnets 115, 116, 117, and 118 is secured adjacent the other longitudinal end of the stator 102, two on each of the upper and lower halves 105 and 106. The magnets 115, 116, 117, and 118 of the second circumferential array are identical to the magnets 110, 111, 112, and 113 of the first circumferential array. If desired, the longitudinally adjacent magnets 110, 111, 112, and 113 of the first circumferential array and the magnets 115, 116, 117, and 118 of the second circumferential array may be formed as single longitudinally extending magnets. As best shown in FIG. 16, a small circumferential gap is maintained between adjacent magnets in both the first and second circumferential arrays.

A plurality of radially inwardly extending stator teeth are provided on each of the magnets 110, 111, 112, and 113 of the first circumferential array and on each of the magnets 115, 116, 117, and 118 of the second circumferential array. In the illustrated embodiment, the stator teeth are formed from a plurality of stator tooth members 120. Each of the stator tooth members 120 is generally flat and rectangular in shape, but is curved to correspond to the radius of curvature of the inner surfaces of the associated permanent magnets. The stator tooth members 120 are preferably formed from a magnetically permeable material, such as iron. In the illustrated embodiment, each of the stator tooth members 120 is formed having twelve radially inwardly extending teeth 121, for a total of forty-eight stator teeth 121. However, it will be appreciated that a greater or lesser number of stator teeth 121 may be provided.

The permanent magnets cause the associated stator tooth members 120 to exhibit a polar magnetization which is the same as the adjacent radially inner surfaces thereof. Thus, the stator tooth members 120 provided on the opposed magnets 110 and 112 of the first circumferential array exhibit a south polar magnetization, while the stator tooth members 120 provided on the other opposed magnets 111 and 113 of the first circumferential array exhibit a north polar magnetization. The stator tooth members 120 provided on the magnets 115, 116, 117, and 118 of the second circumferential array are magnetically polarized in a similar manner.

Figure 13:
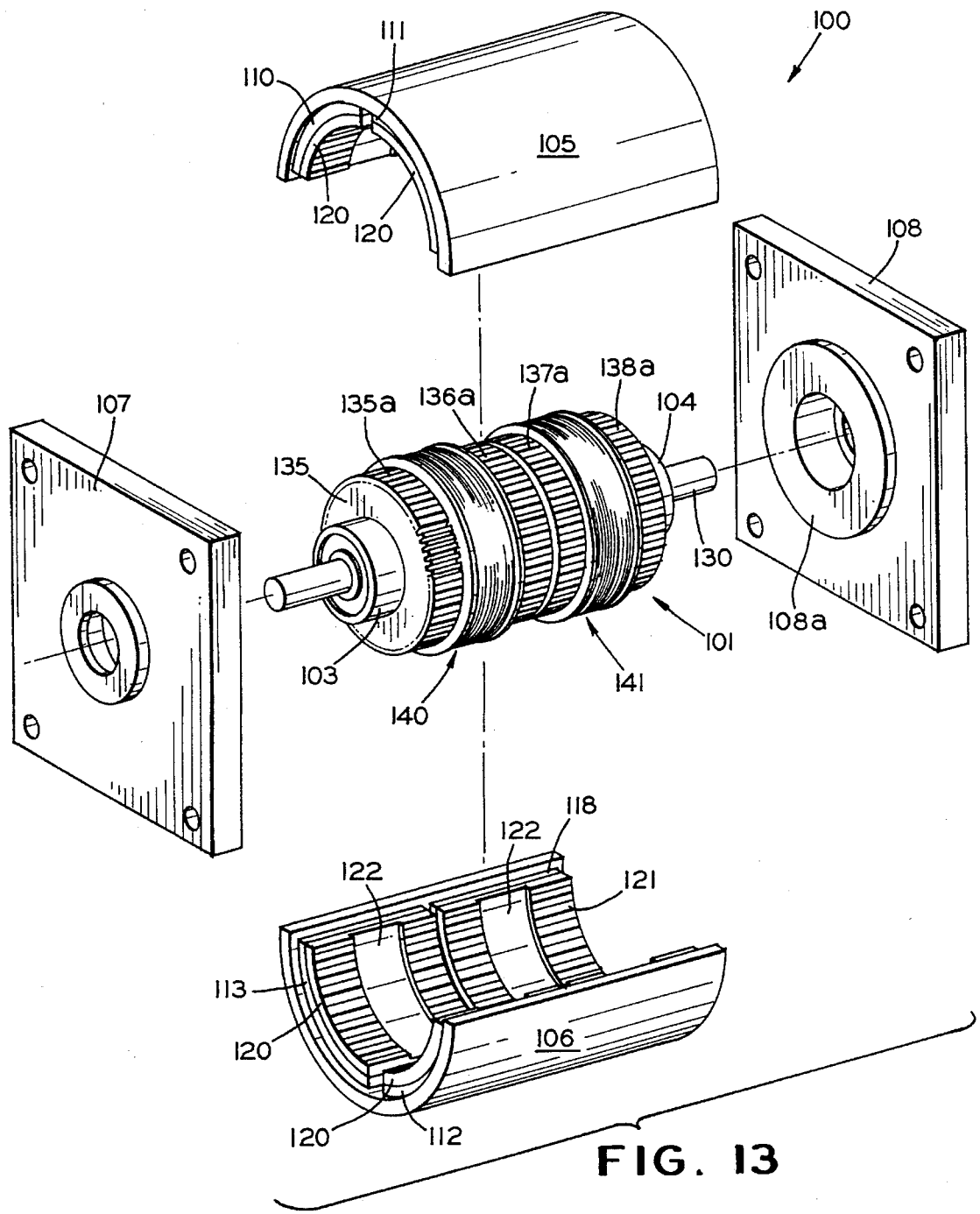
FIG. 13 is an exploded perspective view of a synchronous inductor electric motor in accordance with this invention.
Figure 14:
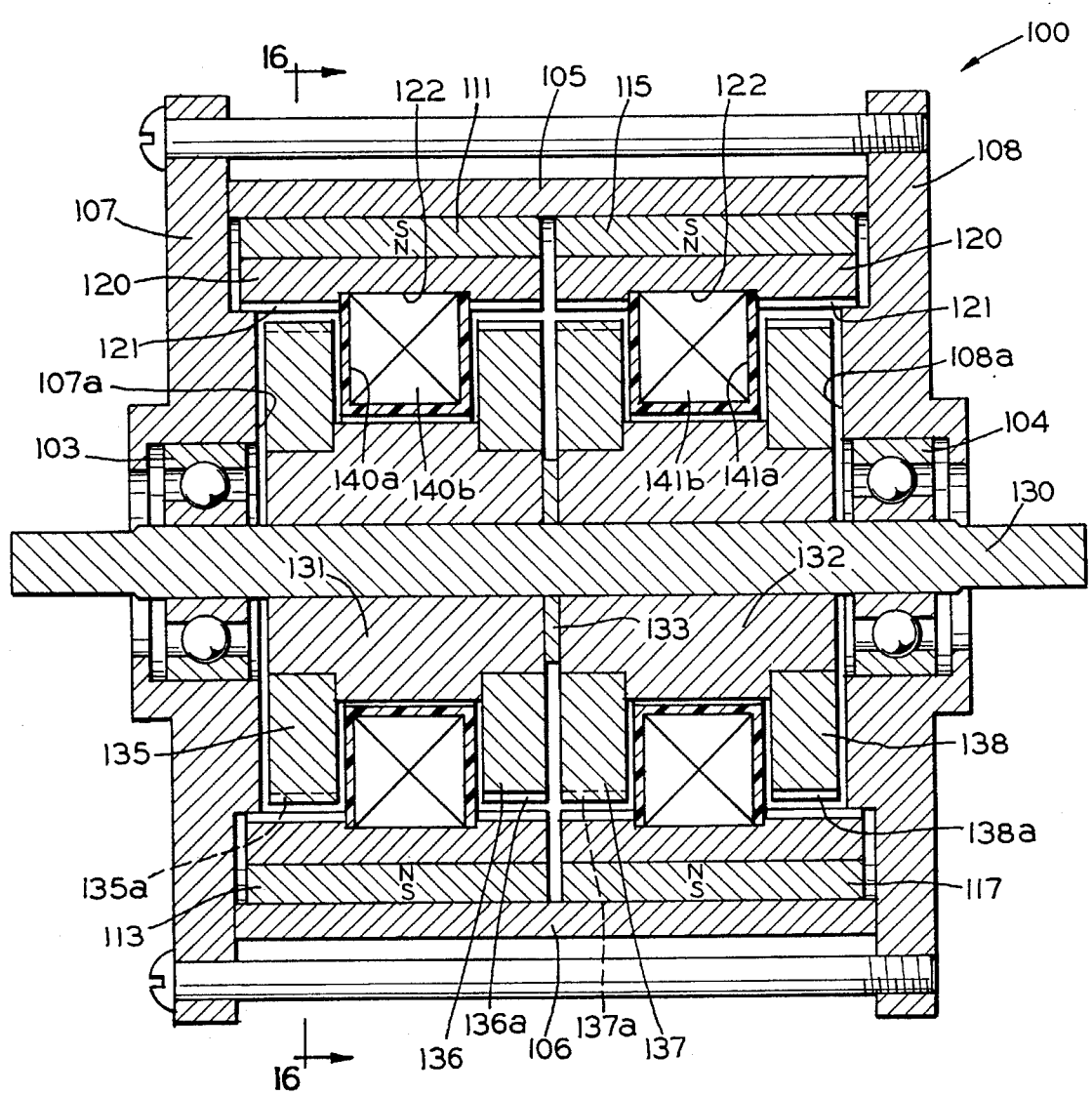
FIG. 14 is a sectional side elevational view of the assembled synchronous electric motor shown in FIG. 13.
Figure 15:
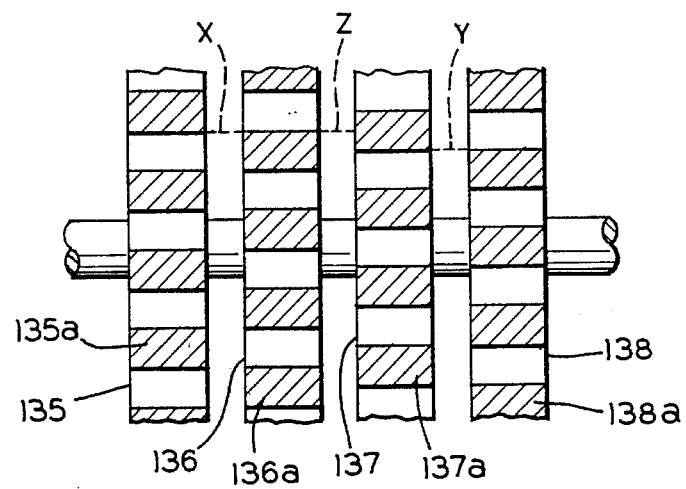
FIG. 15 is an enlarged schematic view of the rotor packs showing the axially offset relationship between the teeth thereof, wherein the cross-hatched areas represent the various rotor teeth.

As best shown in FIGS. 13 and 14, the stator teeth 121 extend axially throughout the lengths of each of the stator tooth members 120. However, within each of the stator tooth members 120, the stator teeth 121 are interrupted by a circumferentially extending annular recess 122 formed in the inner surfaces of the stator tooth members 120. The purpose for these recesses 122 will be described below.

Referring now to FIGS. 13 and 14, the structure of the rotor assembly 101 will be described in detail. The rotor assembly 101 includes a splined cylindrical shaft 130 which extends throughout the length of the motor 100. The rotor shaft 130 is formed from a non-magnetically permeable material. A plurality of rotor pole sub-assemblies are provided on the rotor shaft. Two of such rotor pole sub-assemblies are shown in the illustrated embodiment, although the invention may be practiced with a greater or lesser number. Each of the rotor pole sub-assemblies includes a generally hollow cylindrical hub, as shown at 131 and 132. The hubs 131 and 132 are mounted on the rotor shaft 130 for rotation therewith. The ends of each of the hubs 131 and 132 are formed having reduced outer diameters. Thus, each of the hubs 131 and 132 is defined by a larger diameter central portion which is disposed between two smaller diameter end portions. The outer surfaces of the smaller diameter end portions of the hubs 131 and 132 are splined, for a purpose which will be explained below.

As with the stator 102, the hubs 131 and 132 are formed from a magnetically permeable material, such as iron. The hubs 131 and 132 can be formed in the same manner as described above with respect to the hubs 41, 42, and 43 of the variable reluctance electric motor 30. The hubs 131 and 132 are provided with inner splines which cooperate with the outer splines on the rotor shaft 130 for rotation therewith. A spacer 133 can be mounted on the rotor shaft 130 between the first hub 131 and the second hub 132 to space them apart from one another. The spacer 133 is preferably formed from a non-magnetically permeable material. Then, the hubs 131 and 132 can be secured to the rotor shaft 130 by adhesive or other means so as to prevent axial movement thereof relative to the rotor shaft 130 during use.

Each of the rotor pole sub-assemblies further includes a pair of rotor packs mounted on the associated hub. Thus, as best shown in FIG. 14, first and second rotor packs 135 and 136 are mounted on the opposed reduced diameter end portions of the first hub 131. The first and second rotor packs 135 and 136 are identical in structure, each being formed generally in the shape of a spur gear having a plurality of rotor poles, such as the rotor teeth 135a and 136a, formed about the periphery thereof. In the illustrated embodiment, fifty teeth are formed on each of the first and second rotor packs 135 and 136. Unlike the variable reluctance motor 30 described above, however, the teeth 135a provided on the first rotor pack 135 are not axially aligned with the teeth 136a provided on the second rotor pack 136. Rather, the teeth 135a provided on the first rotor pack 135 are offset from the teeth 136a provided on the second rotor pack 136 by one-half tooth pitch, as shown by the dotted line X in FIG. 15. Thus, the teeth 135a provided on the first rotor pack 135 are axially aligned with the valleys between the teeth 136a provided on the second rotor pack 136. Accordingly, when the teeth 135a provided on the first rotor pack 135 are aligned with the teeth 121 provided on the stator 102, the teeth 136a provided on the second rotor pack 136 are aligned with the valleys between the teeth 121 provided on the stator 102.

Similarly, first and second rotor packs 137 and 138 are mounted on the opposed reduced diameter end portions of the second hub 132. The first and second rotor packs 137 and 138 mounted on the second hub 132 are identical in structure to the first and second rotor packs 135 and 136 mounted on the first hub 131. As with the first and second rotor packs 135 and 136 mounted on the first hub 131, the teeth 137a of the first rotor pack 137 mounted on the second hub 132 are offset from the teeth 138a provided on the second rotor pack 138 mounted on the second hub 132 by one-half tooth pitch, as shown by the dotted line Y in FIG. 15. However, the teeth 135a of the first rotor pack 135 mounted on the first rotor hub 131 are not axially aligned with the teeth 137a of the first rotor pack 137 mounted on the second rotor hub 132. Rather, the teeth 135a of the first rotor pack 135 mounted on the first rotor hub 131 are offset from the teeth 137a of the first rotor pack 137 mounted on the second rotor hub 132 by one-quarter tooth pitch, as shown by the dotted line Z in FIG. 15.

Referring now to FIG. 16, the relationship between the stator teeth 121 and the rotor teeth 135a will be explained. As discussed above, each of the stator tooth members 120 is formed having twelve radially inwardly extending stator teeth 121, for a total of forty-eight stator teeth 121, while fifty teeth 135a are formed on the rotor pack 135. When the twelve stator teeth 121 which are magnetized by the permanent magnet 110 as south poles are radially aligned with the rotor teeth 135a, the twelve stator teeth 121 which are magnetized by the permanent magnet 112 as south poles are also radially aligned with the rotor teeth 135a. At the same time, the twelve stator teeth 121 which are magnetized by the permanent magnet 111 and the twelve stator teeth 121 which are magnetized by the permanent magnet 113 as north poles are radially aligned with the valleys between the rotor teeth 135a.

As previously discussed, the rotor teeth 136a provided on the second rotor pack 136 are offset from the rotor teeth 135a provided on the first rotor pack 136 by one-half tooth pitch. Thus, although not illustrated, it will be appreciated that when the rotor teeth 135a provided on the first rotor pack 135 are radially aligned with the stator teeth 121 which are magnetized by the permanent magnet 110, the rotor teeth 136a provided on the second rotor pack 136 are radially aligned with the valleys between the same stator teeth 121. At the same time, the twelve stator teeth 121 which are magnetized by the permanent magnet 111 are radially aligned with the rotor teeth 136a, the twelve stator teeth 121 which are magnetized by the permanent magnet 111 are radially aligned with the valleys between the rotor teeth 135a, and the twelve stator teeth 121 which are magnetized by the permanent magnet 113 are radially aligned with the valleys between the rotor teeth 135a. The rotor pack teeth 137a and 138a are, as discussed above, offset from the rotor pack teeth 135a and 136a by one-quarter tooth pitch, Therefore, such rotor pack teeth 137a and 138a are similarly aligned with the stator teeth 121 when the rotor assembly 101 is rotated by one-quarter tooth pitch.

Lastly, each of the rotor pole sub-assemblies includes an electromagnetic coil mounted on the associated hub. Thus, as best shown in FIG. 14, a first electromagnetic coil, indicated generally at 140, is disposed about the central portion of the hub 131 between the two rotor packs 135 and 136. The electromagnetic coil 140 is conventional in the art and includes an annular bobbin 140a having a generally U-shaped cross section. An electrically conductive wire is repeatedly wound about the bobbin 140a to form a winding 140b. A similar electromagnetic coil 141 is disposed about the hub 132 of the second rotor pole sub-assemblies. The electromagnetic coil 141 includes an annular bobbin 141a having a winding 141b.

As best shown in FIG. 14, the end bells 107 and 108 are formed having respective inwardly facing cylindrical protrusions 107a and 108a. These protrusions 107a and 108a engage the ends of the teeth 121 of the stator tooth members 120 to pilot the end bells 107 and 108 thereon. Alternatively, the protrusions 107a and 108a may be formed so as to pilot the end bells 107 and 108 on the ends of the upper and lower halves 105 and 106 of the stator 102.

As mentioned above, the rotor assembly 101 is enclosed by the upper and lower halves 105 and 106 of the stator 102 and the front and rear end bells 107 and 108 when assembled. The rotor assembly 101 is supported for rotation within the stator 102 by the pair of bearings 103 and 104. The bearing 103 is mounted on the front end of the rotor shaft 130 adjacent to the hub 131. If desired, a non-magnetic spacer (not shown) may be mounted on the rotor shaft 130 between the first bearing 103 and the hub 131 to space them apart from one another. Similarly, the second bearing 104 is mounted on the rear end of the rotor shaft 130 adjacent to the hub 132. A non-magnetic spacer (not shown) may also be mounted on the rotor shaft 130 between the second bearing 104 and the hub 132 to space them apart from one another. The bearings 103 and 104 are supported in recesses respectively formed in the front and rear end bells 107 and 108. Thus, when the motor 100 is assembled as shown in FIG. 14, the rotor assembly 101 is supported for relative rotation within the stator 102.

As with the bobbins 55a, 56a, and 57a, the inner diameters of the bobbins 140a and 141a are somewhat larger than the outer diameter of the central portions of the associated hubs 131 and 132. As a result, the electromagnetic coils 140 and 141 are not secured to the hubs 131 and 132 for rotation with the rotor assembly 101. Rather, the hubs 131 and 132 (as well as the rotor shaft 130) are able to rotate freely with respect to the electromagnetic coils 140 and 141. The outer diameters of the bobbins 140a and 141a are sized to fit snugly in the aligned annular recesses 122 formed in the upper and lower halves 104 and 105 of the stator 102. Thus, when the motor 100 is assembled as shown in FIG. 14, the electromagnetic coils 140 and 141 are frictionally engaged by or otherwise secured to the inner circumferential surface of the stator 102 and positioned concentrically about the rotor assembly 101. The electromagnetic coils 140 and 141 are connected to respective electrical current pulse generating circuits (not shown), such as shown in FIG. 11, so as to be selectively energized as described below.

In operation, the first current pulse generating circuit is initially activated to generate a pulse of electrical current to the winding 140b of the first electromagnetic coil 140, while no electrical current is supplied to the second electromagnetic coil 141. When the first winding 140b is turned on in this manner, a magnetic circuit is created which causes the rotor packs 135 and 136 to become magnetized. The polarity of this magnetization depends upon the direction of the electrical current flowing through the winding 140b.

For the purpose of illustration, let it be assumed that the left rotor pack 135 on the hub 131 becomes a north magnetic pole, while the right rotor pack 136 on the hub 131 becomes a south magnetic pole. By reference to FIG. 16, it can be seen that the north polarized teeth 135a of the left rotor pack 135 are attracted toward the adjacent south polarized stator teeth 121 provided on the permanent magnets 110 and 112. At the same time, the north polarized teeth 135a of the left rotor pack 135 are repelled away from the adjacent north polarized stator teeth 121 provided on the permanent magnets 111 and 113. Simultaneously, the south polarized teeth 136a of the right rotor pack 136 are repelled away from the adjacent south polarized stator teeth 121 provided on the permanent magnets 110 and 112, and the south polarized teeth 136a of the right rotor pack 136 are attracted toward the adjacent north polarized stator teeth 121 provided on the permanent magnets 111 and 113. Consequently, the rotor assembly 101 is initially oriented relative to the stator 102 in the position illustrated in FIG. 16.

To effect rotation of the rotor assembly 101 relative to the stator 102, the winding 140b of the first electromagnetic coil 140 is turned off, and the winding 141b of the second electromagnetic coil 141 is turned on. As a result, the left rotor pack 137 on the hub 132 becomes a north magnetic pole, while the right rotor pack 138 on the hub 132 becomes a south magnetic pole. In a manner identical to that described above, the polarized teeth 137a and 138a of the left and right rotor packs 137 and 138 are attracted to and repelled away from the adjacent south polarized stator teeth 121. Inasmuch as the rotor pack teeth 137a and 138a are offset from the rotor pack teeth 135a and 136a by one-quarter tooth pitch, the rotor assembly 102 is rotated one-quarter tooth pitch. In this manner, the rotor assembly 102 is driven to rotate one-quarter tooth pitch relative to the stator 101.

Further rotation of the rotor assembly 102 is accomplished by again turning on the winding 140b of the first electromagnetic coil 140 and turning off the winding 141b of the second electromagnetic coil 141. However, on this third energization step of the cycle, the direction of electrical current passing through the winding 140b of the first electromagnetic coil 140 is reversed. As a result, the left rotor pack 135 on the hub 131 becomes a south magnetic pole, while the right rotor pack 136 on the hub 131 becomes a north magnetic pole. In this manner, the rotor assembly 102 is again driven to rotate one-quarter tooth pitch relative to the stator 101. In the final step in the cycle, the winding 140b of the first electromagnetic coil 140 is turned off, and the winding 141b of the second electromagnetic coil 141 is turned on. As a result, the left rotor pack 137 on the hub 132 becomes a south magnetic pole, while the right rotor pack 138 on the hub 132 becomes a north magnetic pole. In this manner, the rotor assembly 102 is again driven to rotate one-quarter tooth pitch relative to the stator 101.

Figure 17:
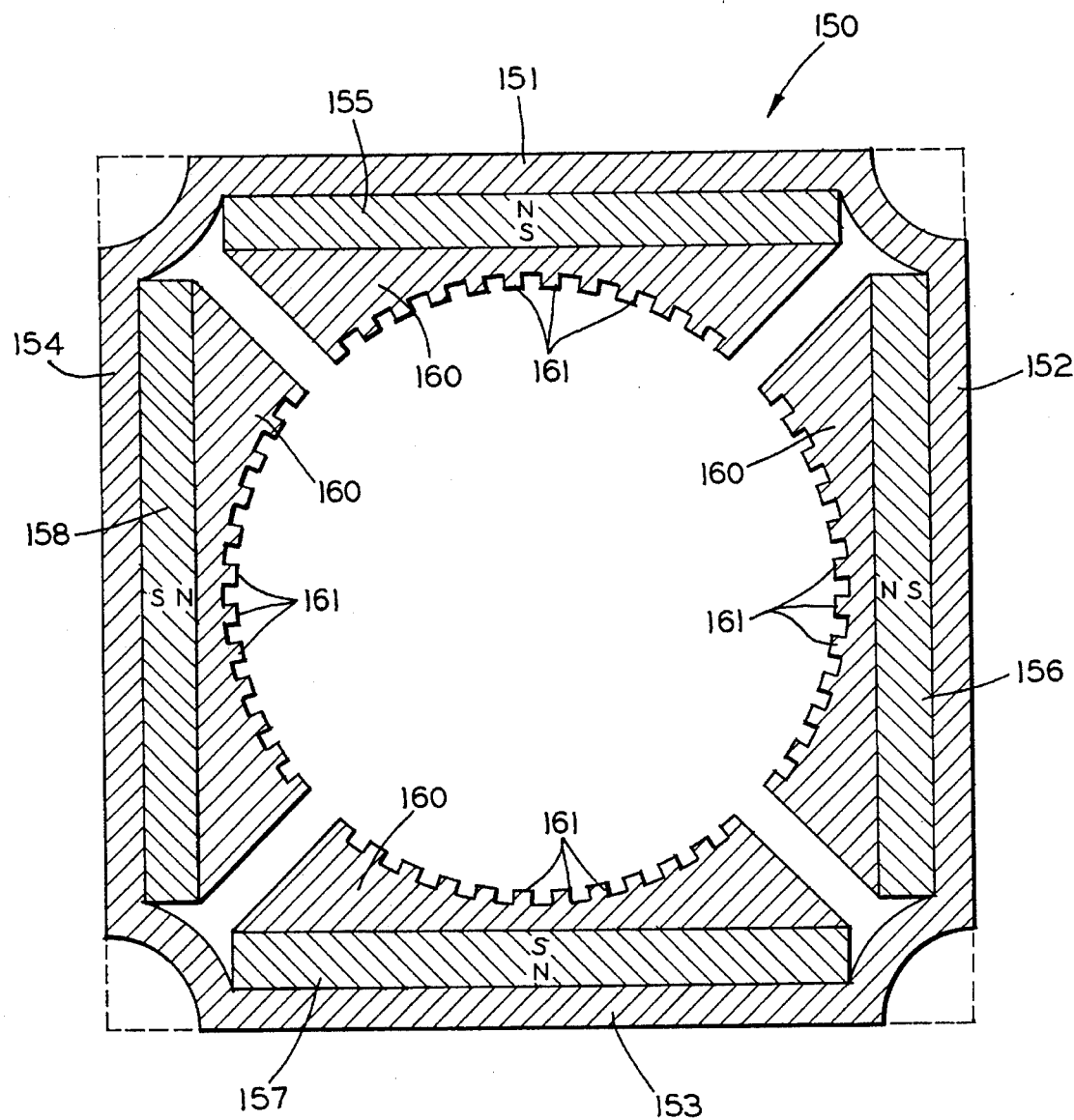
FIG. 17 is a sectional elevational view similar to FIG. 16 illustrating an alternate embodiment of a stator for use in a synchronous inductor electric motor in accordance with this invention.

Referring now to FIG. 17, there is illustrated an alternate embodiment of a stator, indicated generally at 150, for use in a synchronous inductor electric motor such as previously discussed. In this embodiment, the stator 151 has a generally square cross sectional shape defining four sides 151, 152, 153, and 154. As will be explained below, each of the four sides 151, 152, 153, and 154 of the stator 150 represents a stator pole. The corners defined at the intersections of each of the four sides 151, 152, 153, and 154 are preferably cut away in a concave manner as shown. However, it will be appreciated that such corners may be maintained in a square configuration, as shown by the dotted lines. A rotor assembly, such as the rotor assembly 101 described above, may be rotatably supported within the stator 150 in the above-described manner.

A first plurality of permanent magnets are attached to the inner surfaces of the four sides 151, 152, 153, and 154 of the stator 150 adjacent one end thereof. In the embodiment illustrated in FIGS. 17, flat rectangular magnets 155, 156, 157, and 158 are respectively secured to each of the inner surfaces of the four sides 151, 152, 153, and 154 of the stator 150. The magnets 155, 156, 157, and 158 are polarized in alternating fashion about the stator 150. Thus, the inner surfaces of the opposed magnets 155 and 157 and are magnetic south poles, while the outer surfaces of such opposed magnets 155 and 157 are magnetic north poles. Similarly, the inner surfaces of the other opposed magnets 156 and 158 are magnetic north poles, while the outer surfaces of such opposed magnets 156 and 158 are magnetic south poles. A second plurality of permanent magnets (not shown) are attached to the inner surfaces of the four sides 151, 152, 153, and 154 of the stator 150 adjacent the opposite end thereof, similar to the magnets 115, 116, 117, and 118 described above.

A plurality of radially inwardly extending stator teeth are provided on each of the first plurality of magnets 155, 156, 157, and 158 and on each of the second plurality of magnets. In the illustrated embodiment, the stator teeth are formed from a plurality of stator tooth members 160. Each of the stator tooth members 160 has an outer surface which is generally flat and rectangular in shape so as to lie flat against its associated permanent magnet 155, 156, 157, and 158. The inner surface of each of the stator tooth members 160 is curved to correspond to the radius of curvature of the rotor assembly. The stator tooth members 160 are preferably formed from a magnetically permeable material, such as iron. In the illustrated embodiment, each of the stator tooth members 160 is formed having twelve radially inwardly extending teeth 161, for a total of forty-eight stator teeth 161. However, it will be appreciated that a greater or lesser number of stator teeth 161 may be provided. The operation of the stator 150 within the motor as a whole is substantially the same as described above.

In both of the above-described embodiments of the synchronous inductor motor, the stator teeth 121 and 161 extend axially throughout the lengths of each of the associated stator tooth members 120 and 160. Thus, such stator teeth 121 and 161 are axially aligned. Within each of the rotor pole sub-assemblies, however, the rotor teeth 135*a* provided on the first rotor pack 135 are offset from the rotor teeth 136*a* provided on the second rotor pack 136 by one-half tooth pitch, as shown by the dotted line X in FIG. 15. A person having ordinary skill in the art will appreciate that this invention may be practiced by providing the reverse tooth structure.

In the reverse tooth structure, the stator teeth 121 and 161 located on one axial side of the electromagnetic coil are offset from the stator teeth 121 and 161 located on the opposite axial side of the electromagnetic coil by one-half tooth pitch, while the rotor teeth 135*a* provided on the first rotor pack 135 are axially aligned with the rotor teeth 136*a* provided on the second rotor pack 136. Similarly, a person having ordinary skill in the art will further appreciate that the stator teeth 121 and 161 may be staggered throughout the axial length of the motor, in a manner similar to that illustrated in FIG. 15, while all of the rotor teeth are axially aligned.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. An electric motor comprising:
   a hollow stator formed from a magnetically permeable material, said stator having an inner surface;
   a plurality of permanent magnets disposed adjacent to said inner surface of said stator, each of said plurality of permanent magnets being polarized from an inner surface exhibiting a first polar magnetization to an outer surface exhibiting a second polar magnetization, said polar magnetizations of said plurality of permanent magnets alternating about said inner surface of said stator;
   a stator tooth member disposed adjacent to said inner surface of each of said plurality of permanent magnets, each of said stator tooth members having a plurality of inwardly extending stator poles formed thereon, each of said stator tooth members being formed from a magnetically permeable material such that said stator poles thereon exhibit a polar magnetization which is the same as said polar magnetization exhibited by said inner surface of said permanent magnet disposed adjacent thereto;
   a rotor assembly supported within said stator for rotation relative thereto, said rotor assembly including a shaft, a pair of rotor packs mounted on said shaft for rotation therewith, and an electromagnetic coil disposed about said shaft between said pair of rotor packs, each of said pair of rotor packs having a plurality of outwardly extending rotor poles formed thereon which are disposed adjacent to said stator poles of said stator tooth members, each of said pair of rotor packs being formed from a magnetically permeable material; and
   means for connecting said electromagnetic coil to a source of electrical current so as to generate a magnetic circuit which attracts said rotor poles toward said stator poles so as to cause said rotor assembly to rotate relative to said stator.

2. The electric motor defined in claim 1 wherein said permanent magnets are secured to said inner surface of said stator.

3. The electric motor defined in claim 1 wherein four of said permanent magnets are secured to said inner surface of said stator.

4. The electric motor defined in claim 3 wherein said four permanent magnets are arranged in first and second opposed pairs on said inner surface of said stator.

5. The electric motor defined in claim 4 wherein said first opposed pair of permanent magnets are polarized from an inner surface exhibiting a north polar magnetization to an outer surface exhibiting a south polar magnetization, and wherein said second opposed pair of permanent magnets are polarized from an inner surface exhibiting a south polar magnetization to an outer surface exhibiting a north polar magnetization.

6. The electric motor defined in claim 1 wherein said stator tooth members are secured to said inner surfaces of said plurality of permanent magnets.

7. The electric motor defined in claim 1 wherein each of said plurality of stator poles is formed as a plurality of teeth on said stator tooth members.

8. The electric motor defined in claim 7 wherein said teeth of said stator tooth members are angularly aligned with one another.

9. The electric motor defined in claim 1 wherein said rotor assembly includes a hub mounted on said shaft for rotation therewith, said pair of rotor packs being mounted on the ends of said hub for rotation therewith, said electromagnetic coil being disposed about said hub between said pair of rotor packs.

10. The electric motor defined in claim 1 wherein each of said plurality of rotor poles is formed as a plurality of teeth about an outer circumferential surface of each of said pair of rotor packs.

11. The electric motor defined in claim 1 wherein said electromagnetic coil is disposed loosely about said shaft such that said rotor assembly is free to rotate relative thereto.

12. The electric motor defined in claim 1 wherein said electromagnetic coil is supported on said stator concentrically about said rotor assembly.

13. The electric motor defined in claim 12 wherein each of said stator tooth members defines an inner surface, and wherein said electromagnetic coil is directly engaged by said inner surfaces of said stator tooth members so as to be supported concentrically about said rotor assembly.

14. The electric motor defined in claim 13 wherein said stator poles are formed on said inner surfaces of said stator tooth members, and wherein a recessed area is formed in each of said inner surfaces of said stator tooth members, said electromagnetic coil being disposed within said recessed areas so as to be supported concentrically about said rotor assembly.

15. The electric motor defined in claim 1 wherein said pair of rotor packs is a first pair of rotor packs and said electromagnetic coil is a first electromagnetic coil, and further including a second pair of rotor packs mounted on said shaft for rotation therewith, and a second electromagnetic coil disposed about said shaft between said second pair of rotor packs, each of said second pair of rotor packs having a plurality of outwardly extending rotor poles formed thereon which are disposed adjacent to said stator poles of said stator tooth members, each of said second pair of rotor packs being formed from a magnetically permeable material.

16. The electric motor defined in claim 15 wherein said rotor assembly includes a first hub mounted on said shaft for rotation therewith, said first pair of rotor packs being mounted on the ends of said first hub for rotation therewith, said first electromagnetic coil being disposed about said first hub between said first pair of rotor packs, and further including a second hub mounted on said shaft for rotation therewith, said second pair of rotor packs being mounted on the ends of said second hub for rotation therewith, said second electromagnetic coil being disposed about said second hub between said second pair of rotor packs.

17. The electric motor defined in claim 15 wherein each of said first pair of rotor poles is formed as a plurality of teeth about an outer circumferential surface of each of said first pair of rotor packs, and wherein each of said second pair of rotor poles is formed as a plurality of teeth about an outer circumferential surface of each of said second pair of rotor packs.

18. The electric motor defined in claim 17 wherein said teeth of said first pair of rotor packs are angularly offset from one another by one-half tooth pitch, and wherein said teeth of said second pair of rotor packs are angularly offset from one another by one-half tooth pitch.

19. The electric motor defined in claim 18 wherein said teeth of said first pair of rotor packs are angularly offset from said teeth of said second pair of rotor packs by one-quarter tooth pitch.

20. An electric motor comprising:
   a hollow cylindrical stator formed from a magnetically permeable material, said stator having an inner surface extending from a first end to a second end;
   a first plurality of permanent magnets secured to said inner surface of said stator in a circumferential array adjacent to said first end, each of said first plurality of permanent magnets being radially polarized from an inner surface exhibiting a first polar magnetization to an outer surface exhibiting a second polar magnetization, said polar magnetizations of said first plurality of permanent magnets alternating about said inner surface of said stator;
   a first stator tooth member secured to said inner surface of each of said first plurality of permanent magnets, each of said first stator tooth members having a plurality of radially inwardly extending stator poles formed thereon, each of said first stator tooth members being formed from a magnetically permeable material such that said stator poles thereon exhibit a polar magnetization which is the same as said polar magnetization exhibited by said inner surface of said permanent magnet disposed adjacent thereto;
   a second plurality of permanent magnets secured to said inner surface of said stator in a circumferential array adjacent to said second end, each of said second plurality of permanent magnets being radially polarized from an inner surface exhibiting a first polar magnetization to an outer surface exhibiting a second polar magnetization, said polar magnetizations of said second plurality of permanent magnets alternating about the circumference of stator;
   a second stator tooth member secured to said inner surface of each of said second plurality of permanent magnets, each of said second stator tooth members having a plurality of radially inwardly extending stator poles formed thereon, each of said second stator tooth members being formed from a magnetically permeable material such that said stator poles thereon exhibit a polar magnetization which is the same as said polar magnetization exhibited by said inner surface of said permanent magnet disposed adjacent thereto;
   a rotor assembly supported within said stator for rotation relative thereto, said rotor assembly including:
      a shaft,
      a first hub mounted on said shaft for rotation therewith, said hub being formed from a magnetically permeable material,
      a first pair of rotor packs mounted on said first hub for rotation therewith, each of said rotor packs having a plurality of radially outwardly extending rotor poles formed thereon which are disposed adjacent to said stator poles of said first stator tooth members, each of said first pair of rotor packs being formed from a magnetically permeable material,
      a first electromagnetic coil disposed about said first hub between said first pair of rotor packs;
      a second hub mounted on said shaft for rotation therewith, said hub being formed from a magnetically permeable material,
      a second pair of rotor packs mounted on said second hub for rotation therewith, each of said second pair of rotor packs having a plurality of radially outwardly extending rotor poles formed thereon which are disposed adjacent to said stator poles of said second stator tooth members, each of said rotor packs being formed from a magnetically permeable material, and
      a second electromagnetic coil disposed about said second hub between said second pair of rotor packs; and
   means for connecting said first and second electromagnetic coils to a source of electrical current so as to generate respective magnetic circuits which attract and repel said rotor poles toward said stator poles so as to cause said rotor assembly to rotate relative to said stator.

* * * * *